(12) United States Patent
Horii

(10) Patent No.: US 11,352,766 B2
(45) Date of Patent: Jun. 7, 2022

(54) WORKING MACHINE WITH A SPEED CONTROL ARRANGEMENT

(71) Applicant: KUBOTA CORPORATION, Osaka (JP)

(72) Inventor: Hiroshi Horii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 303 days.

(21) Appl. No.: 16/449,060

(22) Filed: Jun. 21, 2019

(65) Prior Publication Data

US 2019/0309499 A1 Oct. 10, 2019

Related U.S. Application Data

(63) Continuation of application No. PCT/JP2017/045782, filed on Dec. 20, 2017.

(30) Foreign Application Priority Data

Dec. 22, 2016 (JP) .............................. JP2016-250143
Jun. 29, 2017 (JP) .............................. JP2017-127528

(51) Int. Cl.
*E02F 9/22* (2006.01)
*B60K 20/02* (2006.01)
*F16H 59/08* (2006.01)
*F16H 61/00* (2006.01)
*F16H 61/02* (2006.01)

(52) U.S. Cl.
CPC ................ *E02F 9/22* (2013.01); *B60K 20/02* (2013.01); *E02F 9/2253* (2013.01); *F16H 59/08* (2013.01); *F16H 61/00* (2013.01); *F16H 61/0009* (2013.01); *F16H 61/0262* (2013.01)

(58) Field of Classification Search
CPC ....... E02F 9/2253; E02F 9/2004; E02F 3/325; E02F 9/20
See application file for complete search history.

(56) References Cited

U.S. PATENT DOCUMENTS

| 2013/0160737 A1 | 6/2013 | Case et al. |
| 2013/0312402 A1 | 11/2013 | Horii |
| 2016/0146227 A1* | 5/2016 | Hoshaku ............... E02F 9/2285 60/428 |

FOREIGN PATENT DOCUMENTS

| CN | 1620854 A | 6/2005 |
| CN | 2826963 Y | 10/2006 |

(Continued)

OTHER PUBLICATIONS

International Search Report for PCT/JP2017/045782 (PCT/ISA/210) dated Mar. 13, 2018.

(Continued)

*Primary Examiner* — Abiy Teka
(74) *Attorney, Agent, or Firm* — Birch, Stewart, Kolasch & Birch, LLP

(57) ABSTRACT

A working machine includes a traveling device to change a traveling speed in accordance with a flow rate of an operation fluid, a traveling operation device to change the flow rate of the operation fluid to be supplied to the traveling device, and a switching operation portion to change, at multiple steps, a supply amount of the operation fluid to be supplied to the traveling device, the supply amount corresponding to an operation extent of the traveling operation device.

15 Claims, 19 Drawing Sheets

(56) References Cited

FOREIGN PATENT DOCUMENTS

| | | |
|---|---|---|
| CN | 1940188 A | 4/2007 |
| EP | 2891783 A1 | 7/2015 |
| JP | 5-131860 A | 5/1993 |
| JP | 8-132903 A | 5/1996 |
| JP | 2012-11866 A | 1/2012 |
| JP | 2013-57366 A | 3/2013 |
| JP | 2014-69636 A | 4/2014 |
| JP | 5569188 B2 | 8/2014 |
| WO | WO 2015/004249 A1 | 1/2015 |

OTHER PUBLICATIONS

Written Opinion of the International Searching Authority for PCT/JP2017/045782 (PCT/ISA/237) dated Mar. 13, 2018.

* cited by examiner

FIG.2A

| Shift position F | Changed supply amount (Speed-changing rate = Changed supply amount / Supply amount) |
|---|---|
| F5 | 100% |
| F4 | 80% |
| F3 | 60% |
| F2 | 40% |
| F1 | 25% |

FIG.2B

| Shift position F | Changed opening aperture (Changing rate = Changed operation amount / Operation amount) |
|---|---|
| F5 | 100% |
| F4 | 80% |
| F3 | 60% |
| F2 | 40% |
| F1 | 25% |

FIG.2C

| Shift position F | Changed swash plate angle<br>(Speed-changing rate =<br>Changed swash plate angle / Swash plate angle) |
|---|---|
| F5 | 100% |
| F4 | 80% |
| F3 | 60% |
| F2 | 40% |
| F1 | 25% |

| Shift position F | Changed revolution speed<br>(Changing rate =<br>Changed revolution speed / Revolution speed) |
|---|---|
| F5 | 100% |
| F4 | 80% |
| F3 | 60% |
| F2 | 40% |
| F1 | 25% |

| Shift position F | Changed supply amount (Speed-changing rate = Changed supply amount / Supply amount) |
|---|---|
| F5 | 100% |
| F4 | 80% |
| F3 | 60% |
| F2 | 40% |
| F1 | 25% |
| F0 | 15% |

FIG.5B

| Shift position F | Changed opening aperture (Changing rate = Changed operation amount / Operation amount) |
|---|---|
| F5 | 100% |
| F4 | 80% |
| F3 | 60% |
| F2 | 40% |
| F1 | 25% |
| F0 | 15% |

FIG.5C

| Shift position F | Changed swash plate angle<br>(Speed-changing rate =<br>Changed swash plate angle / Swash plate angle) |
|---|---|
| F5 | 100% |
| F4 | 80% |
| F3 | 60% |
| F2 | 40% |
| F1 | 25% |
| F0 | 15% |

FIG.5D

| Shift position F | Changed revolution speed<br>(Changing rate =<br>Changed revolution speed / Revolution speed) |
|---|---|
| F5 | 100% |
| F4 | 80% |
| F3 | 60% |
| F2 | 40% |
| F1 | 25% |
| F0 | 15% |

FIG.6B

| Grip | Operation member | Function |
|---|---|---|
| 40R1<br>(R-Grip) | Sliding-operation portion 100A | Auxiliary attachment |
| | Push switch101A | |
| | Speed-up switch 70A | Traveling speed-up |
| 40L1<br>(L-Grip) | Sliding-operation portion 100B | Swing |
| | Push switch101B | Horn |
| | Speed-up switch 70B | Traveling speed-down |

FIG.6C

| Grip | Operation member | Function |
|---|---|---|
| 40R1 (R-Grip) | Sliding-operation portion 100A | 1st auxiliary attachment |
| | Push switch101A | Function switching of sliding-operation portion 100B |
| | Speed-up switch 70A | Traveling speed-up |
| 40L1 (L-Grip) | Sliding-operation portion 100B | Swing/2nd auxiliary attachment |
| | Push switch101B | Horn |
| | Speed-up switch 70B | Traveling speed-down |

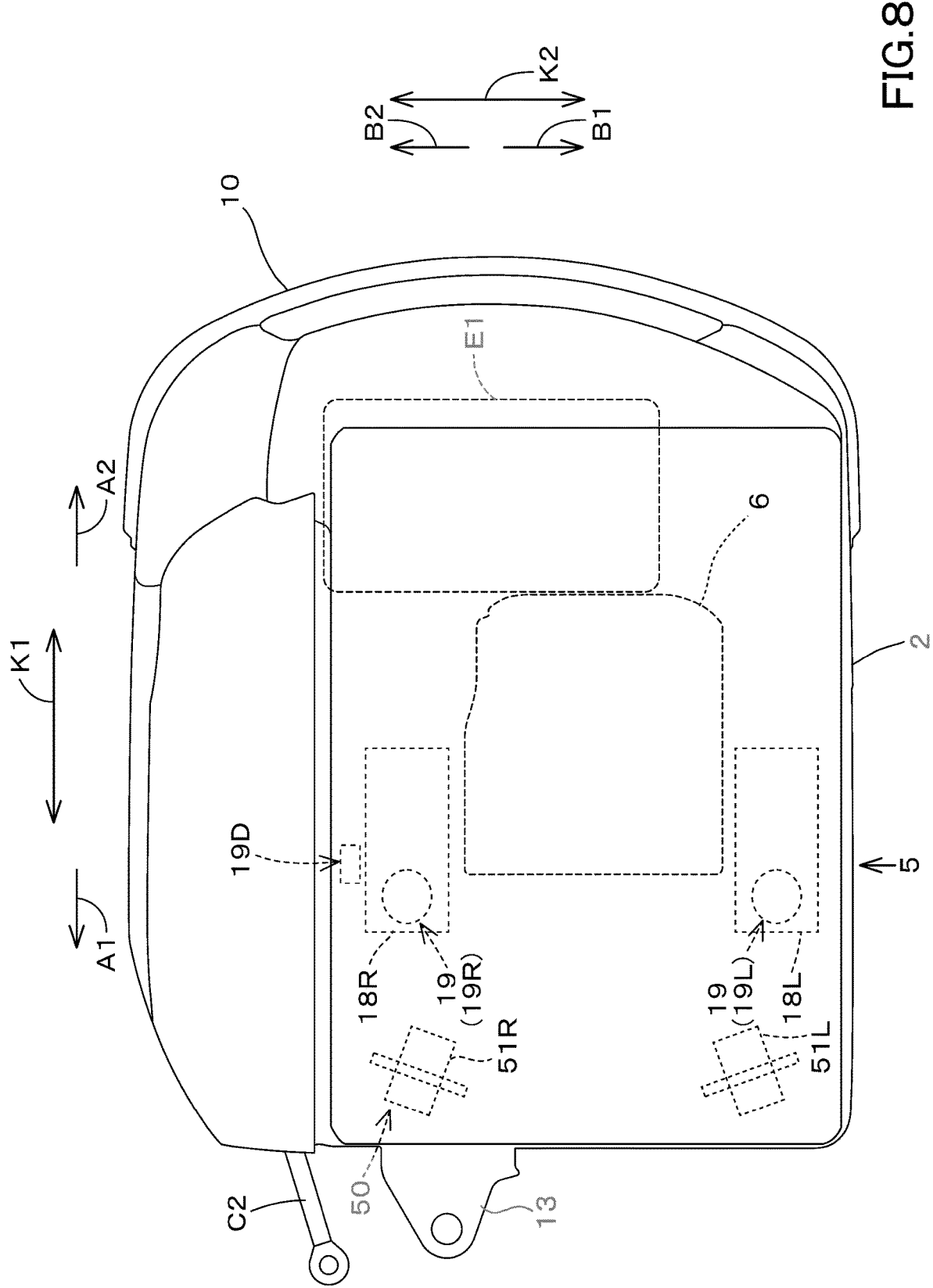

WORKING MACHINE WITH A SPEED CONTROL ARRANGEMENT

CROSS-REFERENCE TO RELATED APPLICATIONS

The present application is a continuation application of International Application No. PCT/JP 2017/045782, filed Dec. 20, 2017, which claims priority to Japanese Patent Application No. 2016/250143, filed Dec. 22, 2016, and to Japanese Patent Application No. 2017/127528, filed Jun. 29, 2017. The contents of these applications are incorporated herein by reference in their entirety.

FIELD OF THE INVENTION

The present invention relates to a working machine such as a backhoe, for example.

DISCUSSION OF THE BACKGROUND

The working machine disclosed in Japanese Unexamined Patent Application No. 2013-57366 is previously known.
The working machine disclosed in Japanese Unexamined Patent Application No. 2013-57366 includes a travel lever supported swingably, an operation valve for changing the pressure of pilot fluid in accordance with an operation extent of the travel lever, and a traveling motor for changing a traveling speed of the working machine in accordance with the pressure of the pilot fluid.

SUMMARY OF THE INVENTION

A working machine according to one aspect of the present invention includes a traveling device to change a traveling speed in accordance with a flow rate of an operation fluid, a traveling operation device to change the flow rate of the operation fluid to be supplied to the traveling device, and a switching operation portion to change, at multiple steps, a supply amount of the operation fluid to be supplied to the traveling device, the supply amount corresponding to an operation extent of the traveling operation device.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a view illustrating speed steps and supply rates (change rates) of a changed supply amount to a supply amount according to the first embodiment;

FIG. 2B is a view illustrating the speed steps and change rates of changed apertures to an operation extent according to the first embodiment;

FIG. 2C is a view illustrating the speed steps and speed-change rates to traveling control parameters (swash plate angles) according to the first embodiment;

FIG. 2D is a view illustrating the speed steps and the speed-change rates to the traveling control parameters (revolution speeds) according to the first embodiment;

FIG. 5A is a view illustrating speed steps and supply rates (change rates) of a changed supply amount to a supply amount according to the second embodiment;

FIG. 5B is a view illustrating the speed steps and change rates of changed apertures to an operation extent according to the second embodiment;

FIG. 5C is a view illustrating the speed steps and speed-change rates to traveling control parameters (swash plate angles) according to the second embodiment;

FIG. 5D is a view illustrating the speed steps and the speed-change rates to the traveling control parameters (revolution speeds) according to the second embodiment;

FIG. 6B is a view illustrating allocation between operation contents and operations of switching operation portion of the working machine according to the second embodiment;

FIG. 6C is a view illustrating a first modified example of the allocation between the operation contents and the operations of the switching operation portion of the working machine according to the second embodiment;

FIG. 8 is a schematic plan view of a part of the working machine according to the embodiments.

DESCRIPTION OF THE EMBODIMENTS

Figure 1:
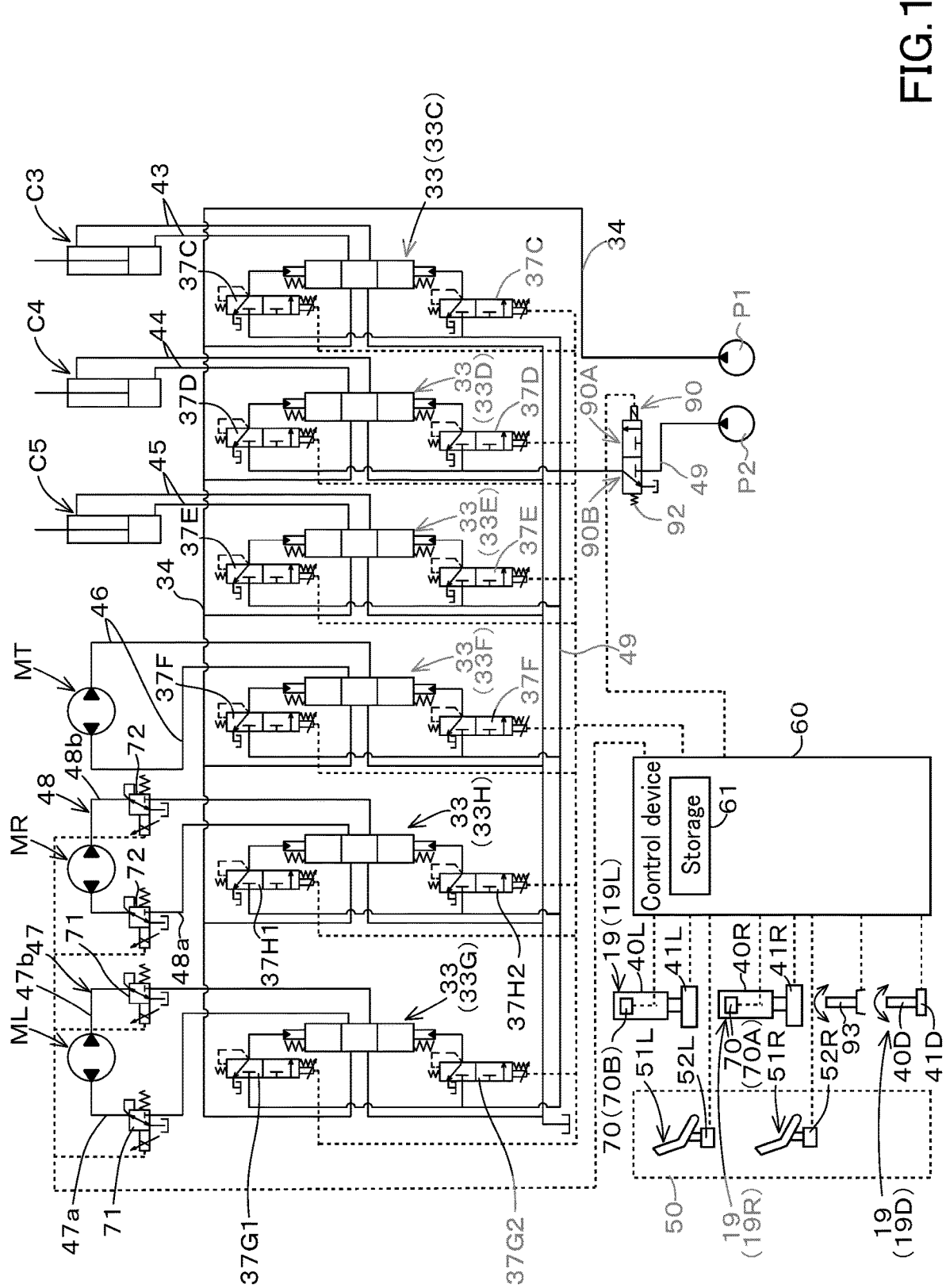
FIG. 1 is a schematic view of a hydraulic system (a hydraulic circuit) for a working machine according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

First Embodiment

First, the overall configuration of the working machine 1 will be described.

Figure 7:
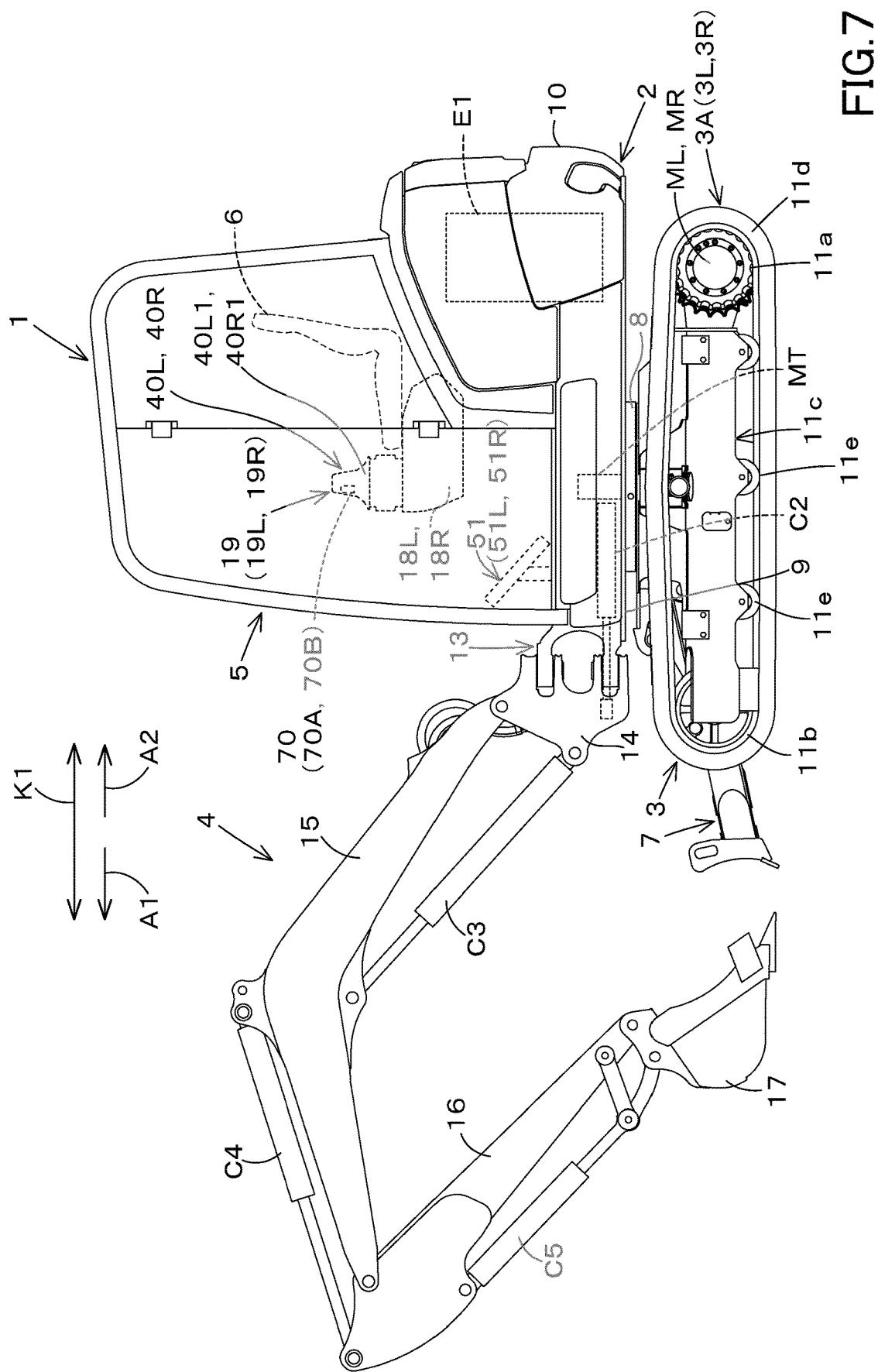
FIG. 7 is a schematic side view of the working machine according to the embodiments.

FIG. 7 is a schematic side view showing the overall configuration of the working machine 1 according to the embodiment of the present invention. FIG. 8 is a schematic plan view of the working machine 1. In the present embodiment, a backhoe which is a swiveling working machine is exemplified as the working machine 1.

As shown in FIG. 7 and FIG. 8, the working machine 1 includes a machine body (a swiveling table) 2, a traveling device 3A, and a working device 4. A cabin 5 is mounted on the machine body 2. An operator seat 6 is arranged in the cabin of the cabin 5.

In the explanation of the present embodiment, the front side (a direction indicated by an arrowed line A1 in FIG. 7 and FIG. 8) of a driver (the operator) seated on the operator seat 6 of the working machine 1 is referred to as the front, the rear side (a direction indicated by an arrowed line A2 in FIG. 7 and FIG. 8) is referred to as the rear, the left side (a front surface side of FIG. 7, a direction indicated by an arrowed line B1 in FIG. 8) is referred to as the left, and the right side (a back surface side of FIG. 7, a direction indicated by an arrowed line B2 in FIG. 8) is referred to as the right.

In addition, a horizontal direction which is a direction orthogonal to the front-rear direction K1 will be referred to as a machine width direction K2 (see FIG. 8) in the explanation. The direction extending from the central portion of the machine body 2 to the right or the left in the machine width direction will be referred to as the machine outward direction. In other words, the machine outward direction is the direction separating away from the center of the machine body 2 in the width direction of the machine body 2, that is, in the machine width direction K2. The direction opposite to the machine outward direction will be referred to as the machine inward direction in the explanation. In other words, the machine inward direction is the direction approaching the center of the machine body 2 in the width direction of the machine body 2, that is, in the machine width direction K2.

As shown in FIG. 7, the traveling device 3A is a device (a hydraulic traveling device) configured to operates using an operation fluid as a power source. The traveling device 3A includes a traveling body (a first traveling body) 3L arranged on the left side and a traveling body (a second traveling body) 3R arranged on the right side. The traveling body 3L and the traveling body 3R include a driving wheel 11a, a driven wheel 11b, a plurality of rolling wheels 11e, a frame 11c rotatably supporting the driving wheel 11a, the driven wheel 11b, and the rolling wheel 11e, and a belt 11d wound on the driving wheel 11a, the driven wheel 11b, and the rolling wheel 11e. The traveling device 3A is a crawler type traveling device. A first traveling motor ML is supported by the frame 11c of the traveling body 3L, and the power of the first traveling motor ML is transmitted to the driving wheels 11a of the traveling body 3L. A second traveling motor MR is supported by the frame 11c of the traveling body 3R, and the power of the second traveling motor MR is transmitted to the driving wheel 11a of the traveling body 3R.

The machine body 2 is pivotably supported on the traveling device 3A by a swiveling bearing 8 about a vertical axis (an axial extending in the vertical direction). The machine body 2 is turned by a turn motor MT constituted of a hydraulic motor (a hydraulic actuator). The machine body 2 has a swiveling base plate 9 which turns about the vertical axis, and a weight 10. The swiveling base plate 9 is formed of a steel plate or the like, and is connected to the swiveling bearing 8. The weight 10 is arranged at the rear portion of the machine body 2. On the rear portion of the machine body 2, a prime mover E1 is mounted. The prime mover E1 is a diesel engine. The prime mover E1 may be an electric motor, or may be a hybrid type having a diesel engine and an electric motor.

The machine body 2 has a support bracket 13 arranged at a front portion slightly close to the right of the center in the machine width direction K2. A swing bracket 14 is attached to the support bracket 13 so as to be pivotable about the vertical axis. The working device 4 is attached to the swing bracket 14.

As shown in FIG. 7, the working device 4 has a boom 15, an arm 16, and a bucket (a working tool) 17.

The base portion of the boom 15 is attached to the swing bracket 14 pivotally about the lateral axis (an axis extending in the machine width direction). In this manner, the boom 15 is freely swung upward and downward. The arm 16 is mounted on the tip end side of the boom 15 pivotally about the lateral axis. In this manner, the arm 16 is configured to be swung forward and backward, and swung upward and downward. The bucket 17 is provided on the tip end side of the arm 16 so as to be able to perform a shoveling operation and a dumping operation. Other working tools (auxiliary attachments) that can be driven by a hydraulic actuator can be attached to the working machine 1 instead of or in addition to the bucket 17. As the other working tools (the auxiliary attachments), a hydraulic breaker, a hydraulic crusher, an angle broom, an earth auger, a pallet fork, a sweeper, a mower, a snow blower, and the like are exemplified.

The swing bracket 14 is swingable by the stretching and the shortening of a swing cylinder arranged in the machine body 2. The boom 15 is swingable by the stretching and the shortening of the boom cylinder C3. The arm 16 is swingable by the stretching and the shortening of the arm cylinder C4. The bucket 17 can perform the shoveling operation and the dumping operation by the stretching and the shortening of a bucket cylinder (a working tool cylinder) C5. Each of the dozer cylinder, the swing cylinder, the boom cylinder C3, the arm cylinder C4, and the bucket cylinder C5 is constituted of a hydraulic cylinder (a hydraulic actuators).

In addition, the working device 4 also includes a dozer device 7 attached to the front portion of the traveling device 3A. The dozer device 7 can be moved upward and downward (can move the blade upward and downwardly) by the stretching and the shortening of the dozer cylinder.

As shown in FIG. 8, on the left side (one side) of the operator seat 6 arranged in the cabin 5, an operation board 18L provided on the vehicle body 2 is arranged. In addition, also on the right side (the other side) of the operator seat 6, an operation board 18R provided on the vehicle body 2 is arranged. Each of the operation board 18L and the operation board 18R is provided with a working operation device 19. The working operation device 19 includes a working operation device (a first working operation device) 19L attached to the operation board 18L, and includes a working operation device (a second working operation device) 19R attached to the operation board 18R. The working operation device 19 may have a working operation device (a third working operation device) 19D arranged on the right side of the operator seat 6, that is, on the right of the operation board 18R.

FIG. 1 schematically shows a hydraulic circuit (a hydraulic system) for operating a hydraulic actuator of the working machine.

As shown in FIG. 1, the hydraulic system for the working machine 1 is a system for operating the working hydraulic actuators such as the boom cylinder C3, the arm cylinder C4, the bucket cylinder C5, and the turn motor MT, and operating the traveling hydraulic actuators such as the first traveling motor ML, the second traveling motor MR. In addition, in FIG. 1, the circuit which controls the dozer cylinder and the swing cylinder is omitted for convenience of the explanation.

The hydraulic system for the working machine 1 includes a first hydraulic pump P1, a second hydraulic pump P2, and a plurality of control valves 33. The first hydraulic pump P1 is a pump that supplies the operation fluid to the working hydraulic actuator and the traveling hydraulic actuator. The first hydraulic pump P1 is, for example, a constant displacement pump (a fixed displacement pump) or a variable displacement pump. In addition, the second hydraulic pump P2 is a pump that supplies the operation fluid for signals, for control, or the like, that is, a pilot fluid. The plurality of control valves 33 are valves that control the working hydraulic actuators and the traveling hydraulic actuators. The first hydraulic pump P1 is connected to the plurality of control valves 33 by a fluid tube 34.

The plurality of control valves 33 include a boom control valve 33C that controls the boom cylinder C3, an arm control valve 33D that controls the arm cylinder C4, a bucket control valve 33E that controls the bucket cylinder C5, and a turn control valve 33F that controls the turn motor MT, a first travel control valve 33G that controls the first travel motor ML, and a second travel control valve 33H that controls the second travel motor MR.

The boom control valve 33C is connected to the boom cylinder C3 by the fluid tube 43. The arm control valve 33D is connected to the arm cylinder C4 by the fluid tube 44. The bucket control valve 33E is connected to the bucket cylinder C5 by an fluid tube 45. The turn control valve 33F is connected to the turn motor MT by an fluid tube 46. The first travel control valve 33G is connected to the first travel motor ML by an fluid tube (a first fluid tube) 47. The second travel control valve 33H is connected to the second travel motor MR by an fluid tube (a second fluid tube) 48.

A boom solenoid valve 37C is connected to a pressure receiving portion of the boom control valve 33C. An arm solenoid valve 37D is connected to a pressure receiving portion of the arm control valve 33D. A bucket solenoid valve 37E is connected to a pressure receiving portion of the bucket control valve 33E. A turn solenoid valve 37F is connected to a pressure receiving portion of the turn control valve 33F. A forward-traveling solenoid valve 37G1 and a backward-traveling solenoid valve 37G2 are connected to the pressure receiving portion of the first travel control valve 33G. A forward-traveling solenoid valve 37H1 and a backward-traveling solenoid valve 37H2 are connected to the pressure receiving portion of the second travel control valve 33H.

That is, the solenoid valves 37 (37C, 37D, 37E, 37F, 37G1, 37G2, 37H1, and 37H2) is respectively connected to the plurality of control valves 33. A second hydraulic pump P2 is connected to each of the solenoid valves 37 by an fluid tube 49, and a pilot pressure that is applied to the pressure receiving portion of the control valve 33 is changed is accordance with the opening aperture of the solenoid valve 37, the control valve 33 corresponding to the solenoid valve 37.

Each of the boom control valve 33C, the arm control valve 33D, the bucket control valve 33E, the turn control valve 33F, the first travel control valve 33G, and the second travel control valve 33H is, for example, a switching valve of direct-acting spool type (a direct-acting spool switching valve). Each of the plurality of control valves 33 (33C, 33D, 33E, 33F, 33G, and 33H) switches a direction of the operation fluid supplied to the control valve 33 with use of the pilot fluid applied to the pressure receiving portion through the plurality of solenoid valves 37 corresponding to the control valve 33, and controls the flow rate of the operation fluid to be supplied to the working hydraulic actuators (the boom cylinder C3, the arm cylinder C4, the bucket cylinder C5, and the turn motor MT) or the traveling hydraulic actuators (the first traveling motor ML and the second traveling motor MR).

The working hydraulic actuator is operated by a working operation device 19 (a working operation device 19L, a working operation device 19R, and a working operation device 19D) gripped by the operator in the operation. The operation control device 19L includes an operation member 40L swingably supported by the operation board 18L and a first operation detection portion 41L configured to detect the swinging amount of the operation member 40L. The operation member 40L is a lever pivotable forward, backward, rightward, and leftward from the neutral position with respect to the operation board 18L. The first operation detection portion 41L is a potentiometer configured to detect the swinging amount of movement (an operation amount) of the operation member 40L from the neutral position.

When the operator or the like operates the operation member 40L, the operation amount and the operation direction of the operation member 40L are detected by the first operation detection portion 41L, and the detected operation amount and the detected operation direction are inputted to the control device 60. The control device 60 magnetizes the solenoid of the turn solenoid valve 37F connected to the pressure receiving portion of the turn control valve 33F in accordance with the operation amount and the operation direction of the operation member 40L to control the opening aperture of the turn solenoid valve 37F. Alternatively, the solenoid of the arm solenoid valve 37D connected to the pressure receiving portion of the arm control valve 33D is magnetized to control the opening aperture of the arm solenoid valve 37D. For example, the control device 60 controls the opening aperture of the turn solenoid valve 37F when the operation direction of the operation member 40L is the left-right direction (the lateral direction), and controls the opening aperture of the arm solenoid valve 37D when the operation direction of the operation member 40L is the front-rear direction. As the result, a pilot pressure is applied to the pressure receiving portion of the turn control valve 33F, the position of the turn control valve 33F is switched, and thereby the rotation direction of the turn motor MT is switched in accordance with the position. Or, a pilot pressure is applied to the pressure receiving portion of the aim control valve 33D, the position of the arm control valve 33D is switched, and thereby the arm cylinder C4 is stretched and shortened in accordance with the position.

The operation control device 19R has an operation member 40R swingably supported by the operation board 18R, and a second operation detection portion 41R that detects the swinging amount of the operation member 40R. The operation member 40R is a lever that can be pivoted forward, backward, rightward, and leftward from the neutral position with respect to the operation board 18R. The second operation detection portion 41R is a potentiometer that detects the swing amount (the operation amount) from the neutral position of the operation member 40R.

When the operator or the like operates the operation member 40R, the operation amount and operation direction of the operation member 40R are detected by the second operation detection portion 41R, and then the detected operation amount and the detected operation direction are inputted to the control device 60. The control device 60 magnetizes the solenoid of the boom solenoid valve 37C in accordance with the operation amount and the operation direction of the operation member 40R, the boom solenoid valve 37C being connected to the pressure receiving portion of the boom control valve 33C, thereby controlling the opening aperture of the boom solenoid valve 37C. Alternatively, in accordance with the operation amount and the operation direction of the operation member 40R, the solenoid of the bucket solenoid valve 37E connected to the pressure receiving portion of the bucket control valve 33E is magnetized to control the opening aperture of the bucket solenoid valve 37E. For example, the control device 60 controls the opening aperture of the bucket solenoid valve 37E when the operation direction of the operation member 40R is the left-right direction, and controls the opening aperture of the boom solenoid valve 37C when the operation direction of the operation member 40R is the front-rear direction. As the result, the pilot pressure is applied to the pressure receiving portion of the boom control valve 33C, the position of the boom control valve 33C is switched, and thereby the boom cylinder C3 is stretched and shortened in accordance with the position. Or, the pilot pressure is applied to the pressure receiving portion of the bucket control valve 33E, the position of the bucket control valve 33E is switched, and thereby the bucket cylinder C5 is stretched and shortened in accordance with the position.

The working operation device 19D is an operation device arranged on the right side of the operator seat 6 separately from the working operation device 19R, and operates the dozer device 7. The operation control device 19D includes an operation member 40D which is swingably supported, and a third operation detecting portion 41D which detects a swinging amount of the operation member 40D. The operation member 40D is a lever that can pivot forward and backward from the neutral position. The third operation detection portion 41D is a potentiometer configured to detect a swinging amount (an operation amount) of the operation member 40D from the neutral position.

When the operator or the like operates the operation member 40D, the operation amount and the operation direction of the operation member 40D are detected by the second operation detection portion 41R, and the detected operation amount and the detected operation direction are inputted to the control device 60. The control device 60 magnetizes the solenoid of the dozer solenoid valve in accordance with the operation amount and the operation direction of the operation member 40D, the dozer solenoid valve being connected to the pressure receiving portion of the dozer control valve, and thereby controlling the opening aperture of the dozer solenoid valve. As the result, the pilot pressure is applied to the pressure receiving portion of the dozer control valve, the position of the dozer control valve is switched, and thereby the dozer cylinder is stretched and shortened in accordance with the position.

As described above, by operating the working operation device 19 (the working operation device 19L, the working operation device 19R, and the working operation device 19D), the machine body 2, the boom 15, the arm 16, the bucket (the working tool) 17, and the dozer device 7 can be operated.

The traveling device 3A, that is, the traveling hydraulic actuators (the first travel motor ML and the second travel motor MR) are operated by the travel control device 50. The travel control device 50 is a device configured to change the operation amount, and is a device configured to change the opening aperture of the travel control valve (the first travel control valve 33G and the second travel control valve 33R) in accordance with the operation amount, thereby increasing and decreasing the flow rate (the supply amount) of the operation fluid to be supplied to the first traveling motor ML and the second traveling motor MR.

In particular, the travel control device 50 includes a first traveling pedal (a first traveling operation portion) 51L, a first travel detection portion 52L, a second traveling pedal (a second traveling operation portion) 51R, and a second travel detection portion 52R.

First, the first traveling pedal 51L and the first travel detection portion 52L will be described below.

The first traveling pedal 51L is a traveling pedal arranged in front of and to the left of the operator seat 6 and configured to increase or decrease the flow rate of the operation fluid supplied by the first travel motor ML. The first traveling pedal 51L is supported to be pivoted forward and backward by a horizontal shaft provided in front of the operator seat 6.

The first travel detection portion 52L is a potentiometer that detects a swinging amount (an operation amount) from a neutral position of the first traveling pedal 51L. That is, when the first traveling pedal 51L swings forward, the first travel detection portion 52L detects a forward operation amount (referred to as a forward-traveling operation amount). In addition, when the first traveling pedal 51L is swung backward, the first travel detection portion 52L detects a backward operation amount (referred to as a backward-traveling operation amount).

The first travel detection portion 52L is connected to the control device 60. The operation amount (the forward operation amount and the backward operation amount) of the first traveling pedal 51L detected by the first travel detection portion 52L is inputted to the control device 60. Hereinafter, the operation amount of the first traveling pedal 51L is generically referred to as a first operation amount, the forward operation amount is generically referred to as a first forward operation amount, and the backward operation amount is generically referred to as a first backward operation amount.

The control device 60 outputs a control signal to the forward-traveling solenoid valve 37G1 or the backward-traveling solenoid valve 37G2 in accordance with the magnitude of the first operation amount, and thereby sets the opening aperture of the forward-traveling solenoid valve 37G1 or the backward-traveling solenoid valve 37G2. For example, in the case where the maximum value of the first forward operation amount of the first traveling pedal 51L (the maximum value of the first forward operation amount detected by the first travel detection portion 52L) is expressed as 100% in percentage, and where the first forward operation amount (the minimum value of the first forward operation amount detected by the first traveling detection portion 52L) is expressed as 0% in percentage, the control device 60 sets the opening aperture of the forward-traveling solenoid valve 37G1 in accordance with the numerical value of the first forward operation amount expressed in the percentage. For example, when the first forward operation amount is 50%, the control device 60 sets the opening aperture of the forward forward-traveling solenoid valve 37G1 to 50%, and when the first forward operation amount is 100%, the control device 60 sets the opening aperture of the forward forward-traveling solenoid valve 37G1 to 100%.

Similarly, in the case where the maximum value of the first backward operation amount of the first traveling pedal 51L is expressed as 100% in percentage, and where the first backward operation amount in the neutral position of the first traveling pedal 51L is expressed as 0% in percentage, the control device 60 sets the opening aperture of the backward-traveling solenoid valve 37G2 is set in accordance with the numerical value of the first backward operation amount indicated in the percentage. For example, when the first backward operation amount is 50%, the control device 60 sets the opening aperture of the backward-traveling solenoid valve 37G2 to 50%, and when the first backward operation amount is 100%, the control device 60 sets the opening aperture of the backward-traveling solenoid valve 37G2 to 100%. As a matter of course, the relationship between the first forward operation amount and the opening aperture of the forward-traveling solenoid valve 37G1 and the relation between the first backward operation amount and the opening aperture of the backward-traveling solenoid valve 37G2 are not limited to the values described above.

Thus, when the operator for example presses the first traveling pedal 51L and the first operation amount which is the pressing amount is detected by the first traveling detection portion 52L, the control device 30 sets the opening apertures of the forward-traveling solenoid valve 37G1 and the backward-traveling solenoid valve 37G2 in accordance with the pressing amount. Thus, the first travel control valve 33G is opened in accordance with the opening apertures of the forward-traveling solenoid valve 37G1 or the backward-traveling solenoid valve 37G2, and thereby increasing or decreasing the flow rate (the first supply amount) of operation fluid flowing from the first travel control valve 33G to the fluid tube 47. That is, the flow rate of the operation fluid supplied from the fluid tube 47 to the first traveling motor ML of the traveling device 3A is increased or decreased in accordance with the operation amount of the traveling control device 50, and thereby the traveling speed in the left-turning of the traveling device 3A (the working machine) can be changed.

Next, the second traveling pedal 51R and the second travel detection portion 52R will be described below.

The second traveling pedal 51R is a traveling pedal arranged in front of and to the right of the operator seat 6 and configured to increase or decrease the flow rate of the operation fluid supplied by the second travel motor MR. The second traveling pedal 51R is supported to be pivoted forward and backward by a horizontal shaft provided in front of the operator seat 6.

The second travel detection portion 52R is a potentiometer that detects a swinging amount (an operation amount) from a neutral position of the second traveling pedal 51R. That is, when the second traveling pedal 51R swings forward, the second travel detection portion 52R detects a forward operation amount. In addition, when the second traveling pedal 51R is swung backward, the second travel detection portion 52R detects a backward operation amount.

The second travel detection portion 52R is connected to the control device 60. The operation amount (the forward operation amount and the backward operation amount) of the second traveling pedal 51R detected by the second travel detection portion 52R is inputted to the control device 60. Hereinafter, the operation amount of the second traveling pedal 51R is generically referred to as a second operation amount, the forward operation amount is generically referred to as a second forward operation amount, and the backward operation amount is generically referred to as a second backward operation amount.

The control device 60 outputs a control signal to the forward-traveling solenoid valve 37G1 or the backward-traveling solenoid valve 37G2 in accordance with the magnitude of the second operation amount, and thereby sets the opening aperture of the forward-traveling solenoid valve 37H1 or the backward-traveling solenoid valve 37H2. For example, in the case where the maximum value of the second forward operation amount of the second traveling pedal 51R (the maximum value of the second forward operation amount detected by the second travel detection portion 52R) is expressed as 100% in percentage, and where the second forward operation amount (the minimum value of the second forward operation amount detected by the second traveling detection portion 52R) is expressed as 0% in percentage, the control device 60 sets the opening aperture of the forward-traveling solenoid valve 37H1 in accordance with the numerical value of the second forward operation amount expressed in the percentage. For example, when the second forward operation amount is 50%, the control device 60 sets the opening aperture of the forward forward-traveling solenoid valve 37H1 to 50%, and when the second forward operation amount is 100%, the control device 60 sets the opening aperture of the forward forward-traveling solenoid valve 37H1 to 100%.

Similarly, in the case where the maximum value of the second backward operation amount of the second traveling pedal 51R is expressed as 100% in percentage, and where the second backward operation amount in the neutral position of the second traveling pedal 51R is expressed as 0% in percentage, the control device 60 sets the opening aperture of the backward-traveling solenoid valve 37H2 is set in accordance with the numerical value of the second backward operation amount indicated in the percentage. For example, when the second backward operation amount is 50%, the control device 60 sets the opening aperture of the backward-traveling solenoid valve 37H2 to 50%, and when the second backward operation amount is 100%, the control device 60 sets the opening aperture of the backward-traveling solenoid valve 37H2 to 100%. As a matter of course, the relationship between the second forward operation amount and the opening aperture of the forward-traveling solenoid valve 37H1 and the relation between the second backward operation amount and the opening aperture of the backward-traveling solenoid valve 37H2 are not limited to the values described above.

Thus, when the operator for example presses the second traveling pedal 51R and the second operation amount which is the pressing amount is detected by the second traveling detection portion 52R, the control device 30 sets the opening apertures of the forward-traveling solenoid valve 37H1 and the backward-traveling solenoid valve 37H2 in accordance with the pressing amount. Thus, the second travel control valve 33H is opened in accordance with the opening apertures of the forward-traveling solenoid valve 37H1 or the backward-traveling solenoid valve 37H2, and thereby increasing or decreasing the flow rate (the second supply amount) of operation fluid flowing from the second travel control valve 33H to the fluid tube 48. That is, the flow rate of the operation fluid supplied from the fluid tube 48 to the second traveling motor MR of the traveling device 3A is increased or decreased in accordance with the operation amount of the traveling control device 50, and thereby the traveling speed in the right-turning of the traveling device 3A (the working machine) can be changed.

Now, when the first traveling pedal 51L and the second traveling pedal 51R are operated at the same time, the control device 60 sets the opening aperture of the traveling solenoid valves (forward-traveling solenoid valves 37G1 and 37H1, backward-traveling solenoid valves 37G2 and 37H2) in accordance with the first operation amount and the second operation amount.

In particular, when the first traveling pedal 51L and the second traveling pedal 51R are stepped to the front side, the control device 60 sets the opening apertures of the forward-traveling solenoid valves 37G1 and 37H1 in accordance with the first forward operation amount and the second forward operation amount which are stepping amounts. In this case, the flow rate of the operation fluid supplied from the first travel control valve 33G to the fluid tube 47 increases and decreases at the time of forward movement, and the flow rate of the operation fluid supplied from the second travel control valve 33H to the fluid tube 48 increases and decreases. As the result, the flow rate of the operation fluid supplied to the first traveling motor ML and the second traveling motor MR is increased or decreased, in this manner, the traveling speed of the traveling device 3A (the working machine) can be changed in forward traveling.

In addition, when the first traveling pedal 51L and the second traveling pedal 51R are stepped backward, the control device 60 sets the opening apertures of the backward-traveling solenoid valves 37G2 and 37H2 in accordance with the first backward operation amount and the second backward operation amount which are stepping amounts. In this case, the flow rate of the operation fluid supplied from the first travel control valve 33G to the fluid tube 47 increases and decreases at the time of backward movement, and the flow rate of the operation fluid supplied from the second travel control valve 33H to the fluid tube 48 increases and decreases. As the result, the flow rate of the operation fluid supplied to the first traveling motor ML and the second traveling motor MR is increased or decreased, in this manner, the traveling speed of the traveling device 3A (the working machine) can be changed in backward traveling.

As described above, according to the travel control device 50, by operating the first traveling pedal 51L, the flow rate (first supply amount) of the operation fluid supplied from the first travel control valve 33G to the fluid tube 47 can be increased or decreased. By operating the traveling pedal 51R, the flow rate (second supply amount) of the operation fluid supplied from the second travel control valve 33H to the fluid tube 48 can be increased and decreased. That is, according to the travel control device 50, it is possible to change the "first supply amount and second supply amount" that is the supply amount of the operation fluid supplied to the traveling device 3A (the first travel motor ML, the second travel motor MR) corresponding to the operation amount of the travel control device 50.

As shown in FIG. 1, the hydraulic system of the working machine 1 includes an unload valve 90 connected to a pilot fluid tube 49 that supplies the pilot fluid. The unload valve 90 is a two-position switching valve that can be switched between a first position (load position) 90A for allowing the pilot fluid to be supplied and a second position (unload position) 90B for stopping the supply. The unload valve 90 is pushed to the second position 90B by a spring 92 or the like. The unload valve 90 is switchable between the first position 90A and the second position 90B through the operation of the operating lock lever 93 pivotally supported on the side of the operator seat 6. A state in which the operating lock lever 93 is lowered at the side of the operator seat 6 and a state in which the operating lock lever 93 is raised at the side of the operator seat 6 are detected by a detection device or the like provided in the vicinity of the operating lock lever 93, and the states are inputted to the control device 60. When the detector detects that the operating lock lever 93 is lowered, the controller 60 magnetizes the solenoid of the unload valve 90 to switch the unload valve 90 to the load position 90A. When the detection device detects that the operating lock lever 93 is raised, the controller 60 demagnetizes the solenoid of the unload valve 90 to switch the unload valve 90 to the unload position 90B.

Thus, when the unload valve 90 is in the unload position, the operation fluid (the pilot fluid) is not supplied to the solenoid valves (boom solenoid valve 37C, arm solenoid valve 37D, bucket solenoid valve 37E, turn solenoid valve 37F, forward-traveling solenoid valve 37G1, backward-traveling solenoid valve 37G2, forward-traveling solenoid valve 37H1, and the backward-traveling solenoid valve 37H2). Thus, the operation by the operation control devices 19 (19L, 19R) are not allowed. On the other hand, when the unload valve 90 is in the load position, the operation fluid (the pilot fluid) can be supplied to the solenoid valves (boom solenoid valve 37C, arm solenoid valve 37D, bucket solenoid valve 37E, turn solenoid valve 37F, forward-traveling solenoid valve 37G1, backward-traveling solenoid valve 37G2, forward-traveling solenoid valve 37H1, and the backward-traveling solenoid valve 37H2). Thus, the operation by the operation control devices 19 (19L, 19R) are allowed.

As shown in FIG. 1, a plurality of first aperture adjustment valves 71 are provided in an fluid tube 47 connecting the first traveling motor ML and the first traveling control valve 33G. The plurality of first aperture adjustment valves 71 are valves that change the supply amount of operation fluid from the first travel control valve 33G to the first travel motor ML, that is, the first supply amount in mid-flow.

In particular, the fluid tube 47 includes a supply-discharge fluid tube 47a for supplying the operation fluid from the first travel control valve 33G to the first traveling motor ML when advancing and for discharging the operation fluid from the first traveling motor ML to the first traveling control valve 33G when reversing, and a supply-discharge fluid tube 47b for supplying the operation fluid from the first travel control valve 33G to the first traveling motor ML when reversing and for discharging the operation fluid from the first traveling motor ML to the first traveling control valve 33G when advancing. The first aperture adjustment valve 71 is provided in each of the supply-discharge fluid tube 47a and the supply-discharge fluid tube 47b. The first aperture adjustment valve 71 is connected to the control device 60. The opening aperture of the first aperture adjustment valve 71 is changed in accordance with the control signal outputted from the control device 60. The first supply amount is changed in accordance with the opening aperture of the first aperture adjustment valve 71, and the changed first supply amount (referred to as a first changed supply amount) is supplied to the first traveling motor ML.

A plurality of second aperture adjustment valves 72 are provided in an fluid tube 48 connecting the second traveling motor MR and the second traveling control valve 33H. The plurality of second aperture adjustment valves 72 are valves that change the supply amount of operation fluid from the second travel control valve 33H to the second travel motor MR, that is, the second supply amount in mid-flow.

In particular, the fluid tube 48 includes a supply-discharge fluid tube 48a for supplying the operation fluid from the second travel control valve 33H to the second traveling motor MR when advancing and for discharging the operation fluid from the second traveling motor MR to the second traveling control valve 33H when reversing, and a supply-discharge fluid tube 48b for supplying the operation fluid from the second travel control valve 33H to the second traveling motor MR when reversing and for discharging the operation fluid from the second traveling motor MR to the second traveling control valve 33H when advancing. The second aperture adjustment valve 72 is provided in each of the supply-discharge fluid tube 48a and the supply-discharge fluid tube 48b. The second aperture adjustment valve 72 is connected to the control device 60. The opening aperture of the second aperture adjustment valve 72 is changed in accordance with the control signal outputted from the control device 60. The second supply amount is changed in accordance with the opening aperture of the second aperture adjustment valve 72, and the changed second supply amount (referred to as a first changed supply amount) is supplied to the first traveling motor MR.

A switching operation portion 70 is connected to the control device 60. The switching operation portion 70 is a switch that can change the amount of operation fluid supplied to the traveling device 3A separately from the traveling control device 50, that is, a switch that can change the traveling speed of the working machine in multiple steps. In particular, the switching operation portion 70 is a switch that can change the amount of operation fluid supplied to traveling device 3A (first supply amount, second supply amount) corresponding to the operation amount (the first operation amount, the second operation amount) of the travel control device 50, that is, a switch that can change, in multiple steps, the first supply amount outputted from the first travel control valve 33G and the second supply amount outputted from the second travel control valve 33H. In other words, the switching operation portion 70 is a switch for setting the opening apertures of the first aperture adjustment valve 71 and the second aperture adjustment valve 72. Further in other words, the switching operation portion 70 is a switch for setting the first changed supply amount entering the first traveling motor ML and the second changed supply amount entering the second traveling motor MR.

An operation signal of the switching operation portion 70 is inputted to the control device 60. FIG. 2A shows a supply ratio between the shifty position (speed-changing position) F which can be set by the switching operation portion 70 and the changed supply amount (first changed supply amount, second changed supply amount) with respect to the supply amount (first supply amount, second supply amount). The relationship between the shift position F and the supply ratio is a value preliminarily set, and is stored in the storage portion 61 or the like of the control device 60. In addition, since the supply ratio is substantially the same as the shift ratio (speed-changing ratio) of the traveling speed of the working machine 1, the description is continued with the supply ratio and the transmission associated each other.

As shown in FIG. 2A, for example, the shift position F is set in five steps F1 to F5, and the shift position F5 which is the highest shift position has a speed-changing rate (supply ratio) of 100%, and the changed supply amount is equal to the supply amount. In the shift position F1 which is the lowest shift position, the speed-changing rate (supply ratio) is 25%, and the changed supply amount is 25% of the supply amount. The speed-changing rate of the shift position F1 is set, for example, in accordance with the traveling speed of the case where the working or the traveling is performed with the auxiliary attachment attached. In addition, the speed-changing rate of the shift position F2 is set, for example, in accordance with the traveling speed at the time of working for putting the soil and the like shoveled up by the bucket 17 or the like on the transport vehicle. The relationship between the shift position F and the speed-changing rate (supply ratio) is not limited to the example described above.

The switching operation portion 70 includes a speed-up switch 70A and a speed-down switch 70B. The speed-up switch 70A is a switch that increases the shift position F, that is, the changed supply amount. The speed-up switch 70A is, for example, a momentary switch, and the shift position F increases each time the momentary switch is pressed. The speed-down switch 70B is a switch that reduces the shift position F, that is, the changed supply amount. The decrease switch 70B is, for example, a momentary switch, and the shift position F decreases each time the momentary switch is pressed.

The speed-up switch 70A and the speed-down switch 70B are provided in the operation control device 19. For example, the speed-down switch 70B is provided to the first operation control device 19L, and the speed increase switch 70A is provided to the second operation control device 19R.

The speed-up switch 70A may be provided in the operation control device 19D for operating the dozer device 7 in addition to the second operation control device 19R, or may be provided only in the operation control device 19D.

In addition, the switching operation portion 70 may be provided in a control device that an operator or the like grips in traveling. In particular, the first traveling pedal 51L and the first traveling operation portion 51R of the travel control device 50 described above are constituted not of the traveling pedal but of a travel lever that is pivotally supported in front of the operator seat 6 or the like. The switching operation portion 70 is provided on the travel lever. For example, in the case where two travel levers are provided, it is preferable to provide the speed-up switch 70A on the travel lever 51R arranged on the right side, and to provide the speed-down switch 70B on the travel lever 51L arranged on the left side. In addition, only one travel lever may be provided, and either one of the speed-down switch 70B and the speed increase switch 70A, or both of the speed-down switch 70B and the speed increase switch 70A may be provided on the one travel lever. The operation mode and function of the travel lever are the same as those of the traveling pedal.

As shown in FIG. 7, the operation member 40R is provided with a grip 40R1 gripped by an operator or the like, and the grip 40R1 is provided with a speed-up switch 70A. The operation member 40L is provided with a grip 40L1 gripped by an operator or the like, and the grip 40L1 is provided with a speed-down switch 70B.

Next, the operation of the switching operation portion 70 (the speed-up switch 70A, the speed-down switch 70B) and the operation of the control device 60 will be described.

The controller 60 has a normal mode and an attachment mode. In the control device 60, the switching between the normal mode and the attachment mode can be performed through a display device connected to the control device 60. The display device in constituted, for example, of a liquid crystal monitor, and is provided with various switches.

When the control device 60 is in the normal mode, the control device 60 reads the shift positions F2 to F5 and the speed-changing rates (supply ratios) corresponding to the shift positions F2 to F5 from the storage portion 61, and holds them. For example, immediately after starting the engine E1 in the normal mode, the shift position F of the control device 60 is set to the second lowest shift position F2. The control device 60 outputs a control signal to the first aperture adjustment valve 71 and the second aperture adjustment valve 72, and keeps the opening apertures of the first aperture adjustment valve 71 and the second aperture adjustment valve 72 to the opening aperture corresponding to the shift position F2.

On the other hand, when the control device 60 is in the attachment mode, the control device 60 reads the speed-changing rates F1 to F5 and the speed-changing rates (supply ratios) corresponding to the shift positions F1 to F5 from the storage portion 61, and holds them. For example, immediately after the engine E1 is started in the attachment mode, the shift position F of the control device 60 is set to the lowest shift position F1. The control device 60 outputs a control signal to the first aperture adjustment valve 71 and the second aperture adjustment valve 72, and keeps the opening apertures of the first aperture adjustment valve 71 and the second aperture adjustment valve 72 to an opening aperture corresponding to the shift position F1.

In either the normal mode or the attachment mode, when the speed-up switch 70A is operated by the operator or the like, the control device 60 increases the shift speed F step by step in accordance with the number of times the speed-up switch 70A is pressed. As a matter of course, when the shift position F is already at the highest position, the control device 60 holds the highest position of the shift position F even when the speed-up switch 70A is operated. The control device 60 outputs a control signal to the first aperture adjustment valve 71 and the second aperture adjustment valve 72 every time the shift position F is changed, and keeps the opening apertures of the first aperture adjustment valve 71 and the second apertures adjustment valve 72 at the opening aperture corresponding to the changed shift position F.

In addition, when the speed-down switch 70B is operated by the operator or the like, the control device 60 decreases the shift position F step by step in accordance with the number of times the speed-down switch 70B is pressed. As a matter of course, when the shift position F is already at the lowest position, the control device 60 keeps the lowest position of the shift position F (the shift position F2 in the normal mode, the shift position F1 in the attachment mode) even when the speed-down switch 70B is operated. The control device 60 outputs a control signal to the first aperture adjustment valve 71 and the second aperture adjustment valve 72 every time the shift position F is changed, and keeps the opening apertures of the first aperture adjustment valve 71 and the second apertures adjustment valve 72 at the opening aperture corresponding to the changed shift position F.

In this manner, by operating the switching operation portion 70 (speed-up switch 70A, speed-down switch 70B) to increase or decrease the shift position F, the flow rate of operation fluid that enters first traveling motor ML and second traveling motor MR, that is, the traveling speed of the working machine 1 can be changed in multiple steps.

In the embodiment described above, the travel control device 50 has the two traveling operation portions, that is, the first traveling operation portion 50L and the second traveling operation portion 50R; however, the travel control device 50 may have only one traveling operation portion in the case of the traveling device 3A which does not drive the first travel motor ML and the second travel motor MR separately. In addition, although the travel control device 50 has two travel detection portions, that is, the first travel detection portion 52L and the second travel detection portion 52R, the travel control device 50 may have only one travel detection portion as in the traveling operation portion.

In addition, although a plurality of first aperture adjustment valves 71 are provided in the hydraulic system, the number of the first aperture adjustment valve 71 may be one when the first fluid tube 47 is a fluid tube for circulating the operation fluid. Although a plurality of second aperture adjustment valves 72 are provided in the hydraulic system, the number of the second aperture adjustment valve 72 may be one when the second fluid tube 48 is a fluid tube for circulating the operation fluid.

FIG. 3A to FIG. 3D show a modified example of the hydraulic system for changing the traveling speed. In FIG. 3A to FIG. 3D, only the hydraulic system necessary for the description is shown, and the other components are omitted.

Figure 3A:
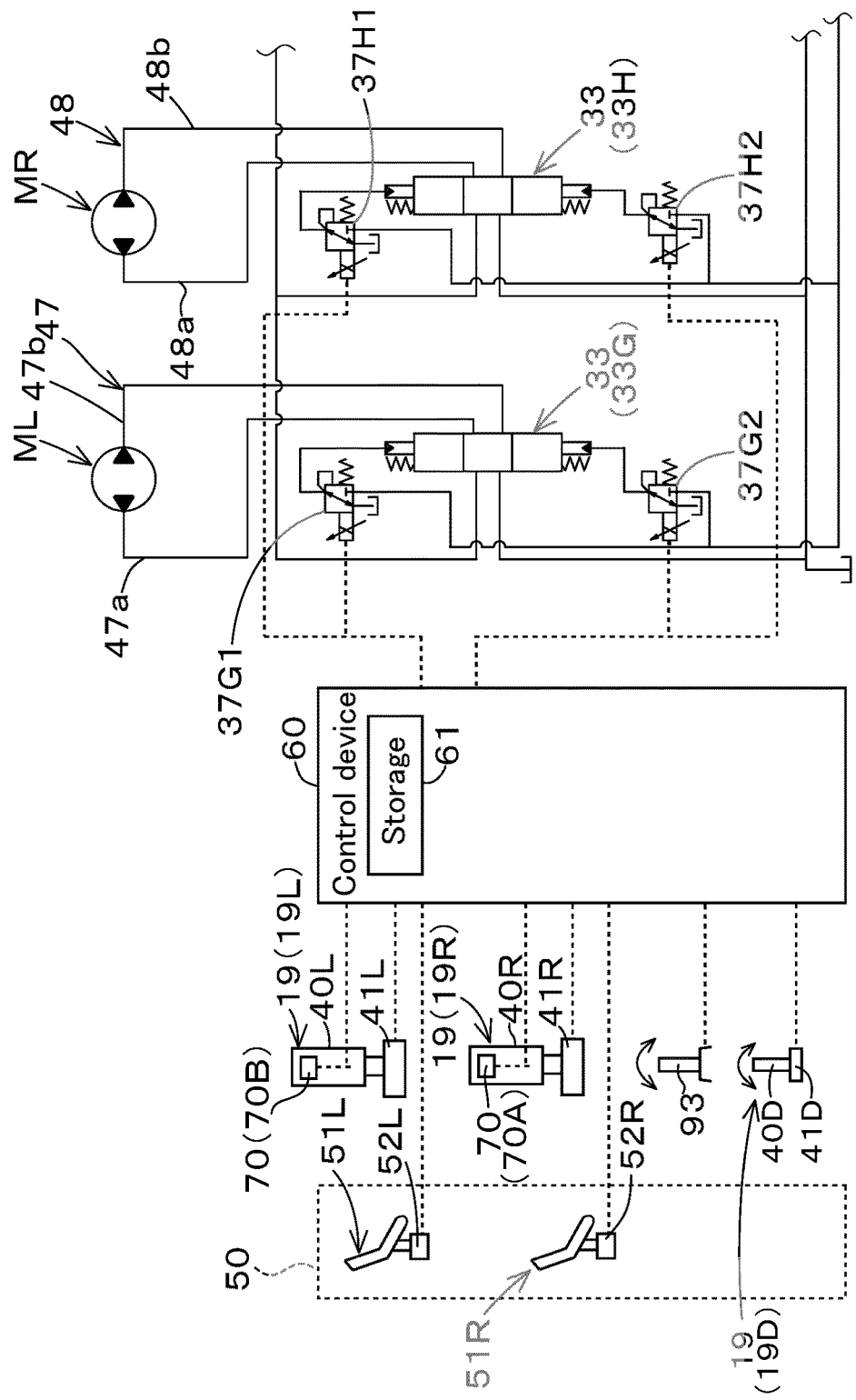
FIG. 3A is a view illustrating a first modified example of the hydraulic system for changing a traveling speed.

In the modified example shown in FIG. 3A, the first aperture adjustment valve 71 and the second aperture adjustment valve 72 are omitted, and the forward-traveling solenoid valve 37G1, the backward-traveling solenoid valve 37G2, the forward-traveling solenoid valve 37H1, and the backward-traveling solenoid valve 37H2 are constituted of solenoid proportional valves (hereinafter referred to as a traveling solenoid valve). The traveling solenoid valve is connected to the control device 60, and is controlled by the control device 60. In particular, the control device 60 stores, for each shift position F (F1 to F5), a speed-changing rates indicating the ratio of the changed operation amount to the operation amount of travel steering device 50, as shown in FIG. 2B, for example. Thus, when the operation amount of the travel control device 50 is inputted to the control device 60, the control device 60 determines the changed opening aperture by multiplying the operation amount by the change ratio, and outputs, to the traveling solenoid valve, a control signal based on the changes opening aperture. The traveling solenoid valve has an opening aperture corresponding to the control signal outputted from the control device 60.

Figure 3B:
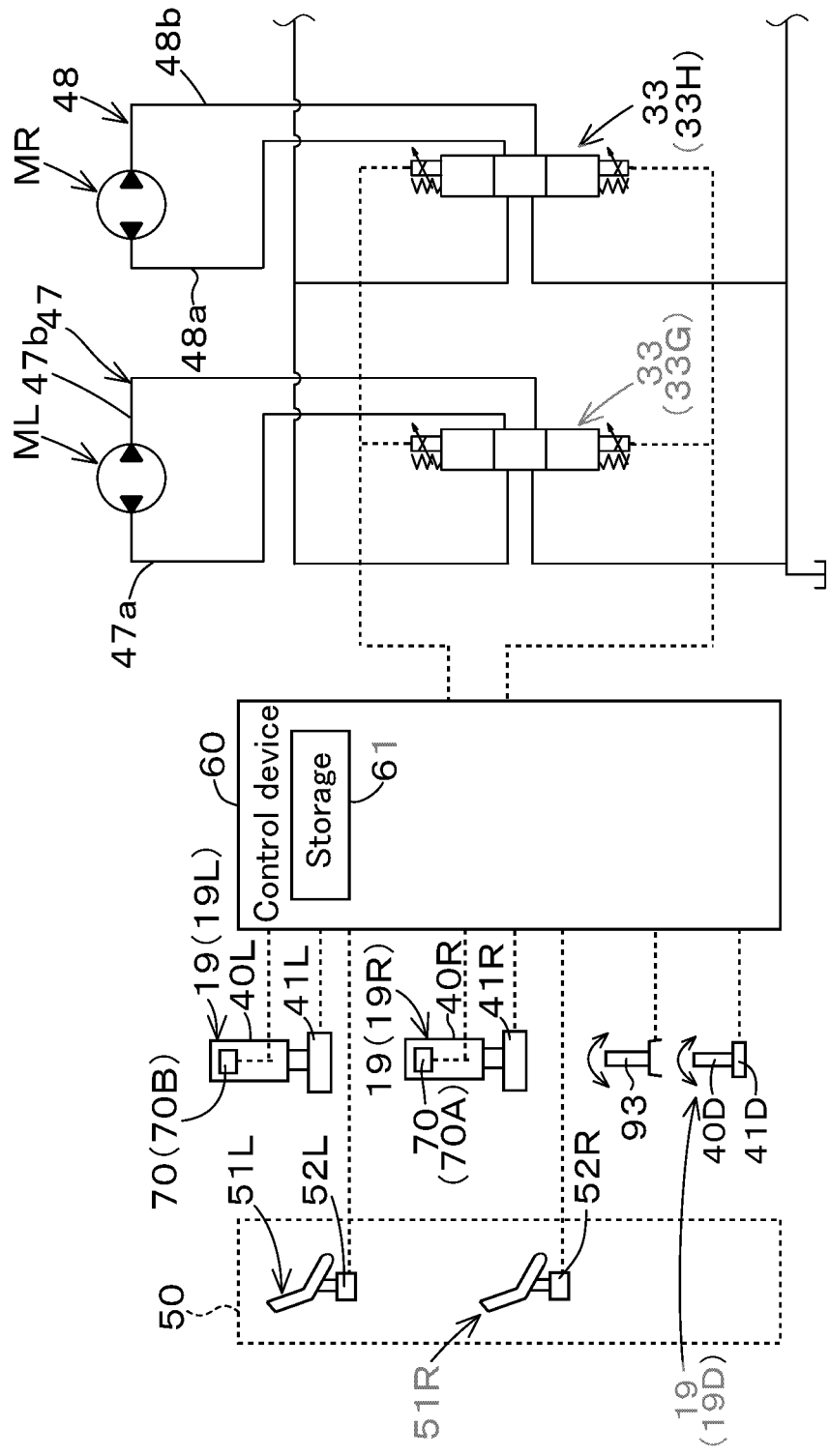
FIG. 3B is a view illustrating the first modified example of the hydraulic system for changing the traveling speed.

In the modified example shown in FIG. 3B, the first aperture adjustment valve 71 and the second aperture adjustment valve 72 are omitted, and the pressure-receiving portions of the first travel control valve 33G and the second travel control valve 33H are replaced by the traveling solenoid valve. That is, the modified example of FIG. 3B is an example in which the first travel control valve 33G and the second travel control valve 33H are replaced by the control valve with a solenoid proportional valve. The operations of the solenoid proportional valves (traveling solenoid valves) in the first travel control valve 33G and the second travel control valve 33H are the same as those of the modified example of FIG. 3A.

Figure 3C:
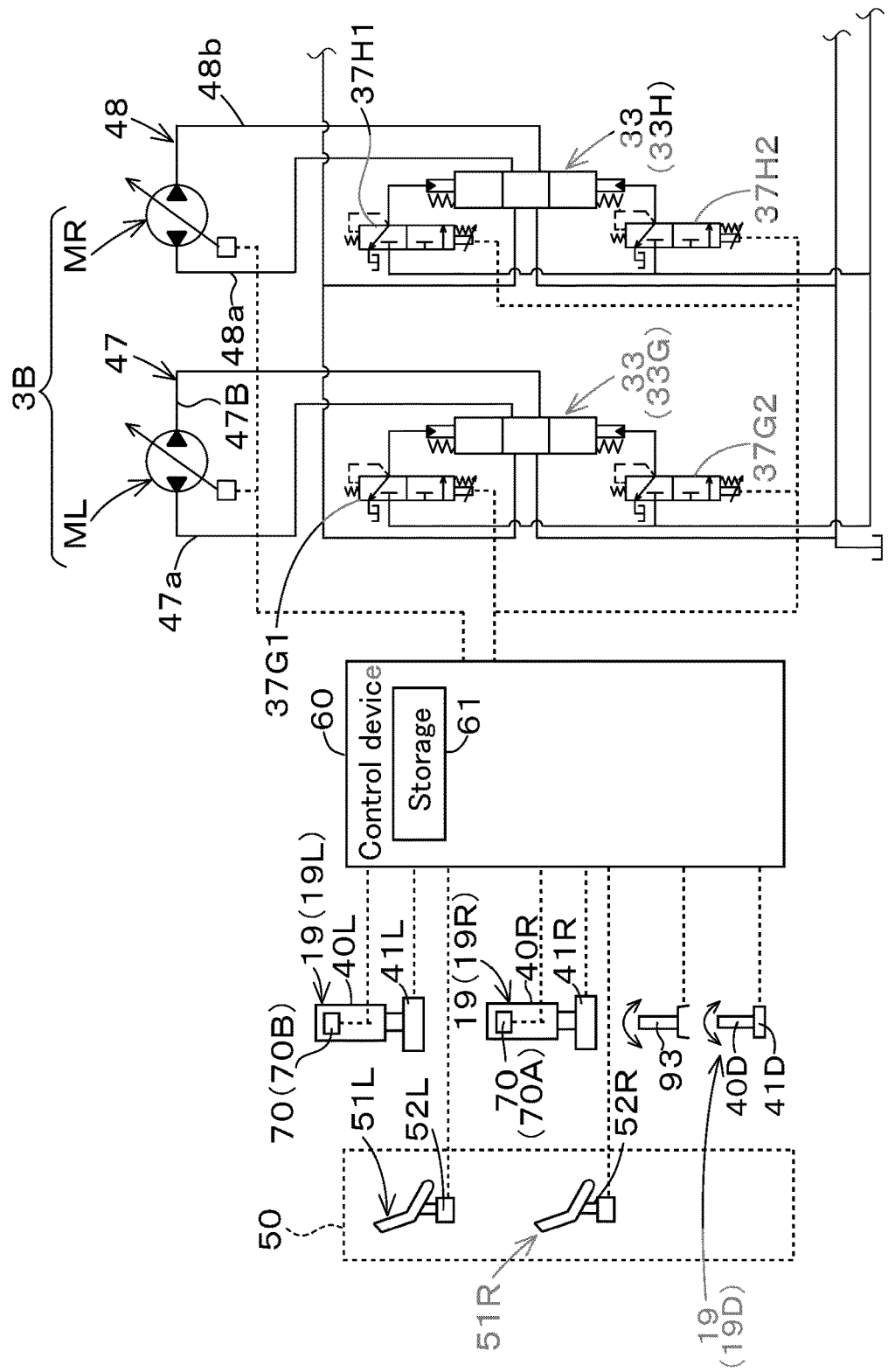
FIG. 3C is a view illustrating the first modified example of the hydraulic system for changing the traveling speed.

The modified example shown to FIG. 3C shows the traveling device 3B configured to change a traveling speed in accordance with the control signal. The traveling device 3B is a hydraulic traveling device in which a regulator or the like for changing the swash plate angle is operated based on the control signal. The traveling device 3B includes a traveling motor (a first traveling motor ML, a second traveling motor MR) configured to be rotated by the operation fluid. The regulators of the first traveling motor ML and the second traveling motor MR operate in accordance with a control signal indicating a travel control value outputted from the control device 60. The travel control value is determined by the travel control device 50 and the switching operation portion 70.

In particular, the travel control device 50 is a device connected to the control device 60 as in the embodiment described above, and is configured to increase or decrease the travel control value (swash plate angle) of the travel device 3B. The switching operation portion 70 is a switch for changing, in multiple steps, the travel control value (swash plate angle) increased or decreased by the travel control device 50.

The switching operation portion 70 is configured to change, in multiple steps, the travel control value of the regulator of the first travel motor ML corresponding to the operation amount of the first traveling pedal 51L of the travel operation device 50 and the travel control value of the regulator of the second travel motor MR corresponding to the operation amount of the first traveling pedal 51R of the travel operation device 50. As shown in FIG. 2C, the control device 60 stores, for each shift position F (F1 to F5), a speed-changing rate indicating the ratio of the changed swash plate angle to the swash plate angle set by the travel control device 50, for example.

Thus, when the operation amount of the travel control device 50 is inputted to the control device 60, the control device 60 calculates the swash plate angle (travel control value) corresponding to the operation amount, and determines the final swash plate angle (travel control value) by multiplying the calculated travel control value by the change ratio, and outputs the determined travel control value (changes travel control value) to the regulator. The regulators of the first traveling motor ML and the second traveling motor MR change the swash plate angle in accordance with the travel control value (changed travel control value) outputted from the control device 60. In this manner, the traveling speed of the working machine 1 can be changed by changing the swash plates of the first traveling motor ML and the second traveling motor MR.

Figure 3D:
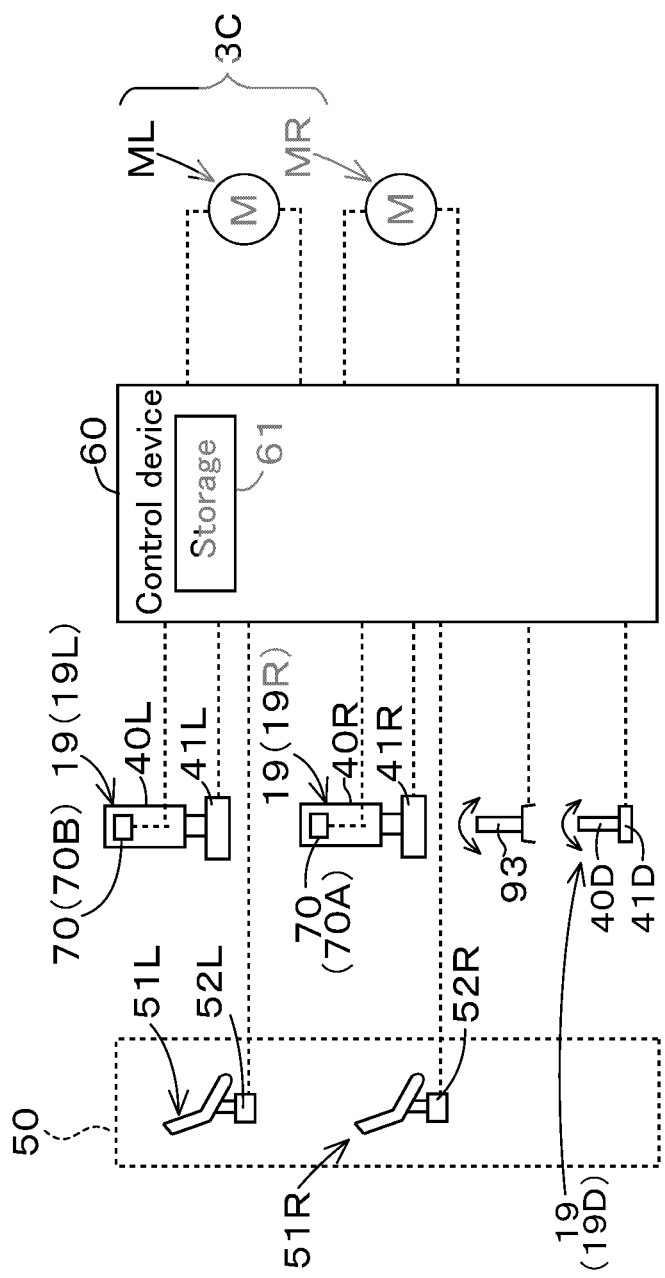
FIG. 3D is a view illustrating the first modified example of the hydraulic system for changing the traveling speed.

The modified example shown in FIG. 3D shows a traveling device 3C in which the traveling speed changes based on the control signal. The traveling device 3C is an electric traveling device that electrically rotates an axle or the like of the working machine 1. The traveling device 3C includes a traveling motor (a first traveling motor ML, a second traveling motor MR). The first traveling motor ML and the second traveling motor MR are electric motors, and the number of revolutions changes according to a control signal indicating a travel control value output from the control device 60. The travel control value (rotational speed) is determined by the travel control device 50 and the switching operation portion 70.

In particular, the travel control device 50 is a device connected to the control device 60 as in the above-described embodiment, and increases or decreases the travel control value (number of revolutions) of the travel device 3D. The switching operation portion 70 is a switch that changes, in multiple steps, the travel control value (rotational speed) increased or decreased by the travel control device 50. The switching operation portion 70 is configured to change, in multiple steps, a revolving speed of the first traveling motor ML corresponding to the operation amount of the first traveling pedal 51L of the travel operation device 50 and a revolving speed of the second traveling motor MR corresponding to the operation amount of the first traveling pedal 51R of the travel operation device 50.

As shown in FIG. 2D, the control device 60 stores, for each shift position F (F1 to F5), a speed-changing ratio which is a ratio of the changed revolving number to the revolving speed set by the travel control device 50, for example. Thus, when the operation amount of the travel control device 50 is inputted to the control device 60, the control device 60 calculates the revolving speed (travel control value) corresponding to the operation amount, determines the final revolving speed (travel control value) by multiplying the calculated revolving speed (travel control value) by the change ratio, and outputs the determined travel control value (changed travel control value) to the first traveling motor Ml and the second traveling motor MR. the traveling solenoid valve, a control signal based on the changes opening aperture. As described above, the traveling speed of the working machine 1 can be changed by changing the revolving speeds of the first traveling motor ML and the second traveling motor MR.

In the present embodiment, the working machine 1 includes the travel devices 3A and 3B, the travel control device 50, and the travel control device 50 configured to change, in multiple steps, the supply amount of the operation fluid to the traveling devices 3A and 3B, the supply amount corresponding to the operation amount of the travel control device 50. Thus, even when the operation amount of the travel control device 50 is not adjusted, the amount of operation fluid supplied to the travel devices 3A and 3B can be changed in multiple steps simply by operating the switching operation portion 70. That is, the traveling speed of the working machine 1 can be easily changed by changing the supply amount of the operation fluid by the switching operation portion 70.

The working machine 1 also includes the travel devices 3C and 3D, the travel control device 50, and the switching operation portion 70 configured to change the travel control value of travel control device 50 in multiple steps. Thus, even when the operation amount of the travel control device 50 is not adjusted, the travel control values for the travel devices 3C and 3D can be changed only by operating the switching operation portion 70. That is, the traveling speed of the working machine 1 can be easily changed by changing the travel control value by the switching operation portion 70.

In addition, the working machine 1 includes the working device 4 and a working operation device 19 gripped at the time of the operation, and the switching operation portion 70 is provided in the working operation device 19. Thus, the switching operation portion 70 can be operated while the working operation device 19 operates the working device 4.

The travel control device 50 is a control device gripped at the time of the operation, and the switching operation portion 70 is provided in the travel control device 50. Thus, it is possible to operate the switching operation portion 70 while performing the travel operation by the travel control device 50. Particularly, in the present embodiment, in the travel control device 50 gripped at the time of the operation, the first traveling pedal 51L arranged at one side of the operator seat 6 is provided with the speed-down switch 70B, and the second traveling pedal 51R arranged at the other side of the operator seat 6 is provided with the speed-up switch 70A. Thus, the operator can increase the speed of the working machine by operating the speed-up switch 70A with the right hand, and can decrease the speed of the working machine by operating the speed-down switch 70B with the left hand.

In addition, the switching operation portion 70 includes a speed-up switch 70A for increasing the amount of operation fluid supplied to the traveling device 3A, and a speed-down switch 70B for reducing the amount of operation fluid supplied to the travel devices 3A and 3B. Thus, the traveling speed of the working machine 1 can be easily changed simply by operating the speed-up switch 70A and the speed-down switch 70B.

The working operation device 19 has the first working operation device 19L arranged at one side of the operator seat 6, and a second working operation device 19R arranged at the other side of the operator seat 6, and the working operation device 19L is provided with a speed-down switch 70B, and the second working operation device 19R is provided with a speed-up switch 70A. Thus, the operator can increase the speed of the working machine 1 by operating the speed-up switch 70A with the right hand, and can decrease the speed of the working machine 1 by operating the speed-down switch 70B with the left hand.

The working device 4 includes the dozer device 7, and separately from the second working operation device 19R, the third working operation device 19D for operating the dozer device 7 is provided on the other side of the operator seat 6, and the third working operation device 19D is provided with the speed-up switch 70A. Thus, the traveling speed of the working machine 1 can be changed while operating the dozer device 7 by the third operation control device 19D.

In the case where the travel control device 50 is a traveling pedal supported swingably, the operator can easily change the travel speed of the working machine 1 by depressing the traveling pedal. For example, in the case where the first traveling pedal 51L is a first traveling pedal and the second traveling pedal 51R is a second traveling pedal, the working machine 1 is moved forward and backward by depressing the first traveling pedal and the second traveling pedal with the left foot and the right foot, respectively. On the other hand, when the working actuator is moved while the operation member 40L is gripped with the left hand and the operation member 40R is gripped with the right hand, and further when the speed-up switch 70A and the speed-down switch 70B are operated with the finger of operator, the traveling speed of the working machine 1 can be easily changed.

Second Embodiment

Figure 4:
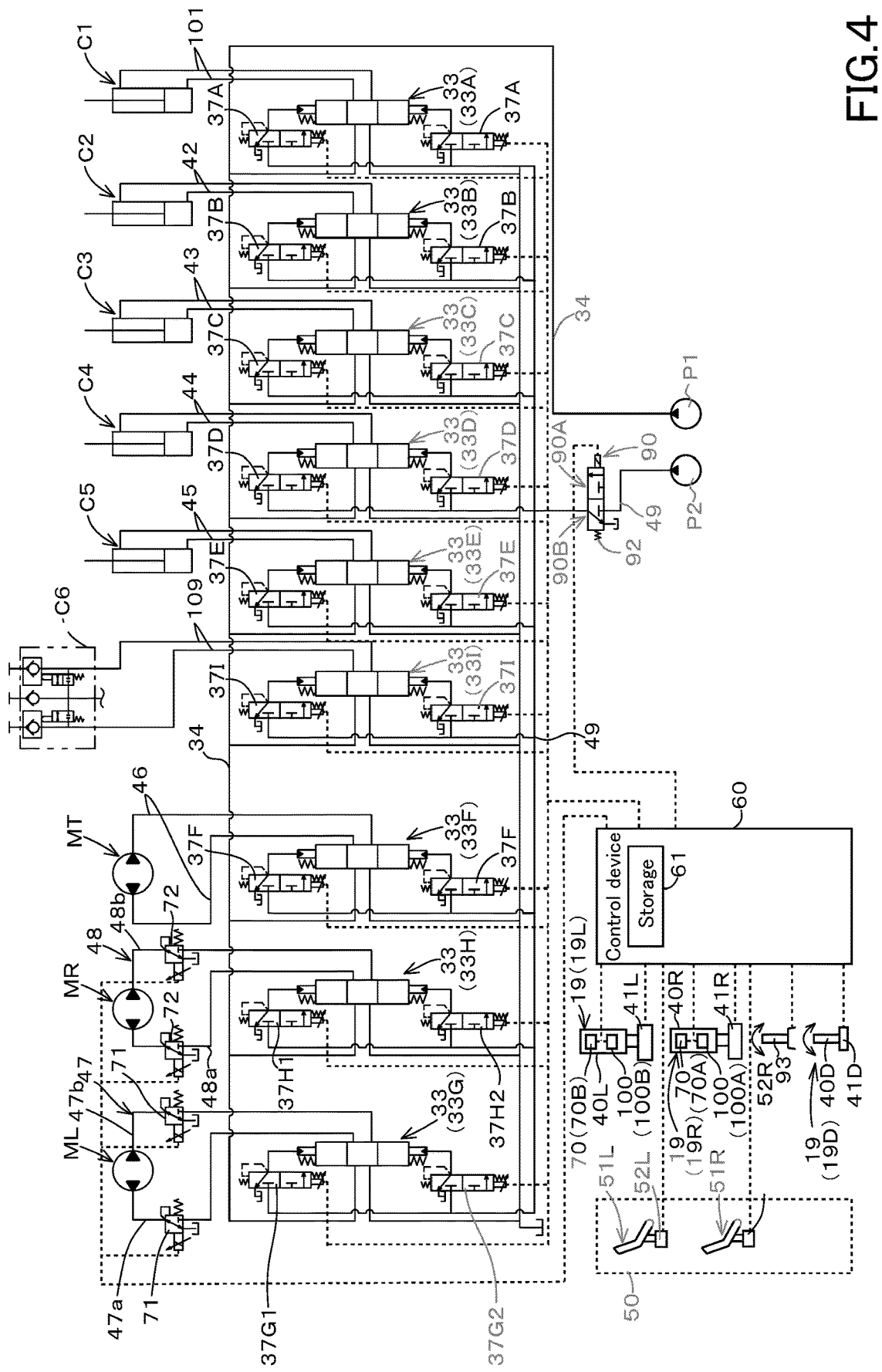
FIG. 4 is a schematic view of a hydraulic system (a hydraulic circuit) for a working machine according to a second embodiment of the present invention.

FIG. 4 shows a working machine 1 according to a second embodiment of the present invention. The same components as in the first embodiment are given the same reference numerals, and the description thereof is omitted.

As described above, instead of or in addition to the bucket 17, another working tool (an auxiliary attachment) that can be driven by a hydraulic actuator can be attached to the working machine.

A connecting member C6 is provided at the front portion of the boom 15. The connecting member C6 is a device that connects the hydraulic device attached to the auxiliary attachment to the first pipe member such as a pipe provided to the boom 15. In particular, the first pipe member can be connected to one end of the connecting member C6, and the second pipe member connected to the hydraulic device of the auxiliary attachment can be connected to the other end. In this manner, the operation fluid flowing in the first pipe member is supplied to the hydraulic device through the second pipe member.

Hereinafter, the dozer cylinder C1, the swing cylinder C2, and the auxiliary attachment in the hydraulic system for the working machine 1 will be described below in detail.

The working machine 1 includes, as the control valve 33, a dozer control valve 33A configured to control the dozer cylinder C1, a swing control valve 33B configured to control the swing cylinder C2, and an auxiliary control valve 33I configured to control an auxiliary attachment.

The dozer control valve 33A is connected to the dozer cylinder C1 by the fluid tube 101. The swing control valve 33B is connected to the swing cylinder C2 by an fluid tube 42. The auxiliary control valve 33I is connected to the auxiliary attachment by the fluid tube 109, the first pipe member, the second pipe member, and the connecting member C6.

The pressure receiving portion of the dozer control valve 33A is connected to the dozer solenoid valve 37A. A swing solenoid valve 37B is connected to a pressure receiving portion of the swing control valve 33B. An auxiliary solenoid valve 37I is connected to the pressure receiving portion of the auxiliary control valve 33I.

That is, the solenoid valves 37 (37A, 37B and 37I) are connected to the plurality of the control valves 33 described above, corresponding to the respective control valves 33. A second hydraulic pump P2 is connected to each of the solenoid valves 37 by an fluid tube 49, and a pilot pressure to be applied to the pressure receiving portion of the control valve 33 corresponding to the solenoid valve 37 is changed in accordance with the opening aperture of the solenoid valve 37.

Each of the dozer control valve 33A, the swing control valve 33B, and the auxiliary control valve 33I is, for example, a switching valve of direct-acting spool type (a direct-acting spool switching valve). Each of the plurality of control valves 33 (33A, 33B, and 33I) switches a direction of the operation fluid supplied to the control valve 33 with use of the pilot fluid applied to the pressure receiving portion through the plurality of solenoid valves 37 corresponding to the control valve 33, and controls the flow rate of the operation fluid to be supplied.

The control device 60 has a normal mode (a first mode), an attachment mode, and a mower mode (a second mode). The mower mode is a mode to be selected when a mower is attached as an auxiliary attachment. In the mower mode, in the case where the working machine 1 works while traveling, the working machine 1 travels at low speed and does not need to travel at high speed. Here, the mower is a mowing machine for mowing grass. In the control device 60, the switching between the normal mode, the attachment mode, and the mower mode can be performed through a display device connected to the control device 60.

When the control device 60 is in the mower mode, the control device 60 reads holds the shift positions F0 to F5 and the speed-changing rates (supply ratios) corresponding to the shift positions F0 to F5 from the storage portion 61 (the storage 61), and holds them. As shown in FIG. 5A, for example, the shift position F is defined by six steps F0 to F5, and the shift position F5, which is the highest shift position, has a speed-changing rate of 100%, and the changed supply amount is equal to the supply amount. The shift position F0, which is the lowest shift position, has a speed-changing rate of 15%, and the changed supply amount is 15% of the supply amount. The speed-changing rate of the shift position F0 is set so that the necessary amount of operation fluid can be supplied to the traveling motors ML and MR in accordance with the traveling speed at which the working machine 1 performs the working while mounting the auxiliary attachment, for example. In this manner, the flow rate of the operation fluid used for the traveling can be kept to the minimum necessary, and thus the flow rate of the operation fluid supplied to the mower (the auxiliary attachment) can be stably secured.

The relationship between the shift position F and the speed-changing rate is not limited to the example described above, and for example, the setting of the supply ratio may be changed by the display device. In addition, the timing at which the setting of the speed-changing rate can be changed is not particularly limited, and the speed-changing rate may be changed only during non-traveling, only during non-operation of the auxiliary attachment, and also during the operation of the auxiliary attachment, for example.

For example, in the mower mode, immediately after the engine E1 is started, the shift position F of the control device 60 is set to the lowest shift position F0. The control device 60 outputs control signals to the first aperture adjustment valve 71 and the second aperture adjustment valve 72, and retains the opening apertures of the first aperture adjustment valve 71 and the second aperture adjustment valve 72 as the opening aperture corresponding to the shift position F0.

In addition, when the sliding operation portion 100A, which will be described later, is operated to maximize the opening aperture of the auxiliary control valve 33I in the mower mode, the opening aperture of the auxiliary control valve 33I is held at the maximum opening aperture. In other words, when the sliding operation portion 100A is operated to maximize the amount of operation fluid to be supplied to the auxiliary attachment, the output amount of the operation fluid to the auxiliary attachment is held at the maximum output amount. If the above operation is performed again, the holding is released. The relationship between the operation amount of the sliding operation portion 100A and the opening aperture of the auxiliary control valve 33I is not limited to the relation described above. For example, after the sliding operation portion 100A is operated to maximize the opening aperture of the auxiliary control valve 33I, the opening aperture of the auxiliary control valve 33I may be synchronized with the operation amount of the operation portion 100A without holding the opening aperture at the maximum until the same operation is performed again.

In any of the normal mode, the attachment mode, and the mower mode, when the speed-up switch 70A is operated by the operator or the like, the control device 60 increases the shift position F by one step in accordance with the number of times the speed-up switch 70A is pressed. As a matter of course, when the shift position F is already at the maximum value, the control device 60 holds the maximum value of the shift position F even if the speed-up switch 70A is operated. The control device 60 outputs a control signal to the first aperture adjustment valve 71 and the second aperture adjustment valve 72 every time when the shift position F is changed, and the opening apertures of the first aperture adjustment valve 71 and the second opening adjustment valve 72 are held at the opening aperture corresponding to the changed shift position F.

In addition, when the speed-down switch 70B is operated by the operator or the like, the control device 60 decreases the shift position F by one step in accordance with the number of times the speed-down switch 70B is pressed. As a matter of course, when the shift position F is already at the minimum value, the control device 60 holds the minimum value (the shift position F2 in the normal mode, the shift position F1 in the attachment mode, and the shift position F0 in the mower mode) of the shift position F even if the speed-down switch 70B is operated. The control device 60 outputs a control signal to the first aperture adjustment valve 71 and the second aperture adjustment valve 72 every time when the shift position F is changed, and the opening apertures of the first aperture adjustment valve 71 and the second opening adjustment valve 72 are held at the opening aperture corresponding to the changed shift position F.

Thus, by operating the switching operation portion 70 (the speed-up switch 70A, the speed-down switch 70B) to increase and decrease the shift position F, the flow rate of the operation fluid that enters the first traveling motor ML and the second traveling motor MR, that is the traveling speed of the working machine 1, can be changed in multiple steps.

FIG. 5B to FIG. 5D show the speed-changing rate of the mower mode corresponding to the modified example of the hydraulic system for changing the traveling speed, the modified example being shown in FIG. 3B to FIG. 3D. That is, in the modified example shown in FIG. 3A and FIG. 3B, the control device 60 stores, for each of the shift positions (F0 to F5), the speed-changing rate representing the ratio of the changed operation amount to the operation amount of the travel control device 50 as shown in FIG. 5B, for example. In the modified example shown in FIG. 3C, the control device 60 stores, for each of the shift positions (F0 to F5), the speed-changing rate representing the ratio of the changed swash plate angle to the swash plate angle set by the travel control device 50 as shown in FIG. 5C, for example. In the modified example shown in FIG. 3D, the control device 60 stores, for each of the shift positions (F0 to F5), the speed-changing rate representing the ratio of the changed revolution speed to the revolution speed set by the travel control device 50 as shown in FIG. 5D, for example.

As described above, the control device 60 of the working machine 1 has the normal mode, the attachment mode, and the mower mode. Thus, in the case where an auxiliary attachment such as a mower is attached to the working machine 1, the operation fluid of an amount adequate to the traveling speed of the working machine 1 can be supplied in the working machine 1 traveling and operating the auxiliary attachment without controlling the traveling speed of the working machine 1.

In the present embodiment, the shift position F is defined by five steps of steps F1 to F5 for the normal mode, and step F0 lower than step F1 is added to the five steps for the mower mode, and thus the shift position F is defined by six steps of steps F0 to F5; however, the number of steps is not limited to that. For example, the shift position F may be defined by five steps of step F0 to step F4 or four steps of step F0 to step F4 for the mower mode. Alternatively, for the mower mode, the speed-changing rate corresponding to steps F1 to F5 may be set to values different from those of the normal mode. For example, for the normal mode, step F1 may be equal to 25%, step F2 may be equal to 40%, step F3 may be equal to 60%, step F4 may be equal to 80%, step F5 may be equal to 100%, and for the mower mode, step F1 may be equal to 15%, step F2 may be equal to 25%, step F3 may be equal to 40%, step F4 may be equal to 60% and step F5 may be equal to 80%.

In addition, in the present embodiment, the case where the mower mode is employed as the second mode has been described; however, the second mode is not limited to the mower mode, and may be another mode in which another working is performed while traveling.

Figure 6A:
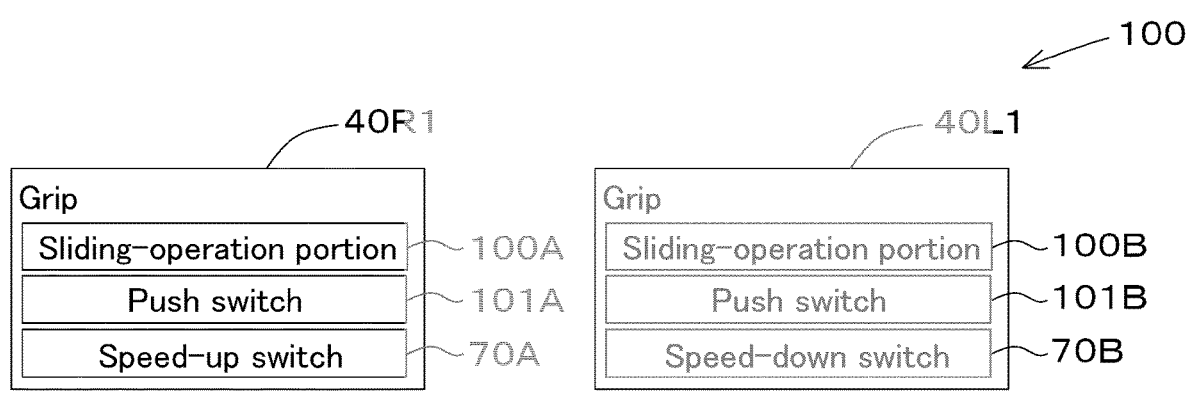
FIG. 6A is a schematic view illustrating an operation member for the working machine according to the second embodiment.

Then, as shown in FIG. 6A, the control device 60 is provided with the operation portion 100.

The operation portion 100 is arranged in the operation control device 19 which is gripped by the operator in the operation. In particular, the operation member 40R of the first operation control device 19R is provided with the grip 40R1 gripped by the operator or the like, and the grip 40R1 is provided with the sliding operation portion 100A, the switch 101A, and the speed-up switch 70A. In addition, the operation member 40L of the second operation control device 19L is provided with a grip 40L1 gripped by an operator or the like, and the grip 40L1 is provided with the sliding operation portion 100B, the switch 101B, and the speed-down switch 70B. The configuration of the operation portion 100 is not limited to the example described above. For example, the operation portion 100 may be provided only in the first operation control device 19R or may be provided only in the second operation control device 19L. The speed-up switch 70A is arranged in the middle of the grip 40R1 and on the front side of the machine. In particular, the speed-up switch 70A is provided at a position with which the forefingers of the operator or the like who grips the grip 40R1 overlap. The speed-up switch 70A is a trigger switch. The sliding operation portion 100A is arranged on the upper side of the grip 40R1 and on the rear side of the machine body. In particular, the sliding operation portion 100A is arranged at the position with which a thumb of an operator or the like who grips the grip 40R1 overlap. The push switch 101A is, for example, constituted of a tact switch, and is arranged in the vicinity of the sliding operation portion 100A (for example, below the sliding operation portion 100A) so that the operator gripping the grip 40R1 can perform the pressing operation with the thumb.

The speed-down switch 70B is provided in the middle of the grip 40L1 and on the front side of the machine body. In particular, the speed-down switch 70B is arranged at the position with which the forefingers of the operator who holds the grip 40L1 overlap. The speed-down switch 70B is a trigger switch. The sliding operation portion 100B is arranged on the upper side of the grip 40L1 and on the rear side of the machine body. In particular, the sliding operation portion 100B is arranged at the position with which a thumb of an operator or the like who grips the grip 40L1 overlap. The push switch 101B is, for example, constituted of a tact switch, and is arranged in the vicinity of the sliding operation portion 100B (for example, below the sliding operation portion 100B) so that the operator gripping the grip 40L1 can perform the pressing operation with the thumb.

The sliding operation portions 100A and 100B are operation devices configured to change the supply amount of the operation fluid to the working device 4, that is, the supply amount of the operation fluid outputted from the control valve 33. In other words, the sliding operation portions 100A and 100B are operation devices configured to set the opening aperture of the solenoid valve connected to the control valve 33. The sliding operation portions 100A and 100B are variable resistors configured to detect the movement amount (the operation amount), for example, such as a slide volume. Operation signals of the sliding operation portions 100A and 100B are inputted to the control device 60. When the sliding operation portions 100A and 100B are slid in one direction, the control device 60 controls the solenoid valve to open. When the sliding operation portions 100A and 100B are slid in the other direction, the control device 60 controls the solenoid valve to close.

In the present embodiment, as shown in FIG. 6B, the sliding operation portion 100A is used for the operation of the auxiliary attachment. The sliding operation portion 100B is used for operating the swing cylinder C2. The sliding operation portions 100A and 100B and the operation target shown in FIG. 6B are merely examples, and for example, the sliding operation portion 100A may be used for the control of the swing angle, and the sliding operation portion 100B may be used for the operation of the auxiliary attachment.

In the present embodiment, the opening aperture of the auxiliary solenoid valve 37I can be set by the operation of the sliding operation portion 100A, and the supply amount of the operation fluid to be outputted to the auxiliary attachment can be changed through the auxiliary control valve 33I.

In addition, the opening aperture of the swing solenoid valve 37B can be set by the operation of the sliding operation portion 100B, and the supply amount of the operation fluid outputted to the swing cylinder C2 can be changed through the swing control valve 33B.

In particular, when the operator or the like operates sliding operation portion 100A, the sliding operation portion 100A detects the operation amount and the operation direction, and then outputs, to control device 60, an operation signal corresponding to the detected operation amount and the detected operation direction. The control device 60 magnetizes the solenoid of the auxiliary solenoid valve 37I connected to the pressure receiving portion of the auxiliary control valve 33I in accordance with the operation amount and the operation direction of the sliding operation portion 100A, and thereby controlling the opening aperture of the auxiliary solenoid valve 37I. As the result, a pilot pressure is applied to the pressure receiving portion of the auxiliary control valve 33B, the position of the swing control valve 37B is switched, and then the swing cylinder C2 is stretched and shortened in accordance with the position. In addition, when the sliding operation portion 100B is operated to maximize the opening aperture of the swing control valve 33B, the swing control valve 33B is held at the opening aperture. In other words, when the operation is performed to maximize the amount of the operation fluid supplied to the swing cylinder C2, the maximum discharge amount is held. When the above operation is performed again, the holding is released.

In addition, when the operator or the like operates the sliding operation portion 100B, the sliding operation portion 100B detects the operation amount and the operation direction, and then outputs, to the control device 60, an operation signal corresponding to the detected operation amount and the detected operation direction. The control device 60 magnetizes the solenoid of the swing solenoid valve 37B connected to the pressure receiving portion of the swing control valve 33B in accordance with the operation amount and the operation direction of the sliding operation portion 100B, and thereby controlling the opening aperture of the swing solenoid valve 37B. As the result, a pilot pressure is applied to the pressure receiving portion of the swing control valve 33B, the position of the swing control valve 37B is switched, and then the swing cylinder C2 is stretched and shortened in accordance with the position. In addition, when the sliding operation portion 100B is operated to maximize the opening aperture of the swing control valve 33B, the swing control valve 33B is held at the opening aperture. In other words, when the operation is performed to maximize the amount of the operation fluid supplied to the swing cylinder C2, the maximum discharge amount is held. When the above operation is performed again, the holding is released.

In addition, by pressing the push switch 101B provided on the grip 40L1, a horn that emits a warning sound can be operated. The function of the horn may be assigned to the push switch 101A provided on the grip 40R1. The speed-up switch 70A and the speed-down switch 70B are assigned as described above.

FIG. 6C shows a modified example. This modified example shows an example of assignment of functions to each switch in the case where the first auxiliary attachment and the second auxiliary attachment different from the first auxiliary attachment are provided as the auxiliary attachment. The sliding operation portion 100A is used for operating the supply amount of operation fluid to the first auxiliary attachment. The sliding operation portion 100B is used for controlling the amount of operation fluid supplied to the swing cylinder C2 and the second auxiliary attachment. The push switch 101A provided on the grip 40R1 is used for switching whether the sliding operation portion 100B is used for operating the swing cylinder C2 or for operating the second auxiliary attachment. That is, in accordance with the operation signal of the push switch 101A, the control device 60 switches the operation target of the sliding operation portion 100B to the swing cylinder C2 or the second auxiliary attachment.

The operation target devices of the switches shown in FIG. 6B and FIG. 6C are merely examples. For example, the sliding operation portion 100A may be an operation device configured to operate a supply amount of the operation fluid to the first auxiliary attachment and the second auxiliary attachment; and the sliding operation portion 100B may be an operation device configured to operate a supply amount of the operation fluid to the first auxiliary attachment and the swing cylinder C2. In addition, in the case where the switching of the sliding operation portion 100B is not required, such as in the case where an auxiliary attachment is single, an operation for maintaining the bucket angle or the like may be assigned to the push switch provided in the grip 40R1.

As described above, in the working machine 1 is provided with the operation portion 100 in at least one of the first working operation device 19L and the second working operation device 19R, the operation portion 100 being configured to change the supply amount of operation fluid to the working device 4. In this manner, it is possible to operate the hydraulic working device such as the boom 15, the arm 16, the auxiliary attachment, and the swing cylinder C2 without switching between the first working operation device 19L and the second working operation device 19R. In this manner, simultaneous operations of the working device 4 and the hydraulic device C2 is facilitated.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims. In the embodiment described above, the traveling device is constituted of a crawler-type traveling device; however, instead of that, the traveling device may be constituted of a wheel-type traveling device having a front wheel and a rear wheel. In the embodiment described above, the first traveling motor ML and the second traveling motor MR are driven by the first traveling control valve 33G and the second traveling control valve 33H; however, instead of that, the first traveling motor ML and the second traveling motor MR may be driven by a traveling pump to be driven with used of the power of the motor E1 or the like (may be Hydro Mechanical Transmission).

What is claimed is:

1. A working machine comprising:
    a traveling device to change a traveling speed in accordance with a flow rate of an operation fluid;
    a traveling operation device to change the flow rate of the operation fluid to be supplied to the traveling device; and
    a switching operation portion to change, at multiple steps, a supply amount of the operation fluid to be supplied to the traveling device, the supply amount corresponding to an operation extent of the traveling operation device,
    wherein the switching operation portion includes:
        a speed-up switch to increase the supply amount of the operation fluid to be supplied to the traveling device; and
        a speed-down switch to decrease the supply amount of the operation fluid to be supplied to the traveling device.

2. The working machine according to claim 1, comprising:
    a working device; and
    a working operation device to operate the working device and to be gripped in being operated,
    wherein the switching operation portion is arranged in the working operation device.

3. The working machine according to claim 2,
    wherein the working operation device includes:
        a first working operation device arranged on one side of an operator seat; and
        a second working operation device arranged on the other side of the operator seat,
    wherein the speed-down switch is arranged in the first working operation device and configured to shift a step down; and
        a speed-up switch arranged in the second working operation device and configured to shift a step up.

4. The working machine according to claim 3,
    wherein the speed-down switch is arranged at a position corresponding to a finger other than a thumb of an operator gripping the first working operation device,
    wherein the speed-up switch is arranged at a position corresponding to a finger other than a thumb of the operator gripping the second working operation device,
    and wherein an operation portion is arranged at a position corresponding to the thumb of the operator gripping at least one of the first working operation device and the second working operation device, the operation portion being configured to change the supply amount of the operation fluid to be supplied to the working device.

5. The working machine according to claim 2,
    wherein the working device includes a dozer device,
    wherein the working operation device includes a third working operation device to operate the dozer device,
    and wherein the speed-up switch is arranged in the third working operation device and configured to shift a step up.

6. The working machine according to claim 1,
    wherein the traveling operation device is an operation device to be gripped in being operated,
    and wherein the switching operation portion is arranged in the traveling operation device.

7. The working machine according to claim 6,
    wherein the traveling operation device includes:
        a first traveling operation portion arranged on one side of an operator seat; and
        a second traveling operation portion arranged on the other side of the operator seat,
    wherein the speed-down switch is arranged in the first traveling operation portion and configured to shift a step down in the multiple steps,
        and wherein the speed-up switch is arranged in the second traveling operation portion and configured to shift a step up in the multiple steps.

8. The working machine according to claim 1,
    wherein the traveling operation device is a traveling pedal supported to be swung.

9. The working machine according to claim 1, comprising a storage portion having a plurality of working modes and storing settings for the working modes, the settings being determined in multiple steps and corresponding, in the multiple steps, to the supply amount of the operation fluid supplied to the traveling device.

10. A working machine comprising:
    a working device;
    a working operation device to operate the working device and to be gripped in being operated;
    a traveling device to change a traveling speed in accordance with a traveling control parameter;
    a traveling operation device to change the traveling control parameter; and
    a switching operation portion to change, at multiple steps, the traveling control parameter of the traveling operation device,
    wherein the working operation device includes:
        a first working operation device arranged on one side of an operator seat; and
        a second working operation device arranged on the other side of the operator seat,
    and wherein the switching operation portion includes:
        a speed-down switch arranged in the first working operation device and configured to shift a step down; and a speed-up switch arranged in the second working operation device and configured to shift a step up.

11. The working machine according to claim 10,
wherein the speed-down switch is arranged at a position corresponding to a finger other than a thumb of an operator gripping the first working operation device,
wherein the speed-up switch is arranged at a position corresponding to a finger other than a thumb of the operator gripping the second working operation device,
and wherein an operation portion is arranged at a position corresponding to the thumb of the operator gripping at least one of the first working operation device and the second working operation device, the operation portion being configured to change the supply amount of the operation fluid to be supplied to the working device.

12. The working machine according to claim 10,
wherein the working device includes a dozer device,
wherein the working operation device includes a third working operation device arranged on the other side of the operator seat separately form the second working operation device and configured to operate the dozer device,
and wherein the speed-up switch is arranged, in addition to the second working operation device or instead of the second working operation device, in the third working operation device.

13. The working machine according to claim 10,
wherein the traveling operation device is a traveling pedal supported to be swung.

14. The working machine according to claim 10, comprising
a storage portion having a plurality of working modes and storing settings for the working modes, the settings being determined in multiple steps and corresponding, in the multiple steps, to the supply amount of the operation fluid supplied to the traveling device.

15. A working machine
a traveling device to change a traveling speed in accordance with a traveling control parameter;
a traveling operation device to change the traveling control parameter, the traveling operation device being an operation device to be gripped in being operated; and
a switching operation portion to change, at multiple steps, the traveling control parameter of the traveling operation device,
wherein the traveling operation device includes:
a first traveling operation portion arranged on one side of an operator seat; and
a second traveling operation portion arranged on the other side of the operator seat,
and wherein the switching operation portion includes:
a speed-down switch arranged in the first traveling operation portion and configured to shift a step down in the multiple steps; and
a speed-up switch arranged in the second traveling operation portion and configured to shift a step up in the multiple steps.

* * * * *